United States Patent
Nakashima

(10) Patent No.: US 9,569,273 B2
(45) Date of Patent: Feb. 14, 2017

(54) APPARATUS AND METHOD FOR CONTROLLING EXECUTION OF A SINGLE THREAD BY MULTIPLE PROCESSORS

(71) Applicant: FUJITSU LIMITED, Kawasaki-shi, Kanagawa (JP)

(72) Inventor: Yoshihisa Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/741,790

(22) Filed: Jun. 17, 2015

(65) Prior Publication Data

US 2016/0048416 A1    Feb. 18, 2016

(30) Foreign Application Priority Data

Aug. 14, 2014   (JP) .................................. 2014-165172

(51) Int. Cl.
  *G06F 9/46*  (2006.01)
  *G06F 9/50*  (2006.01)
  *G06F 9/45*  (2006.01)

(52) U.S. Cl.
  CPC .............. *G06F 9/5066* (2013.01); *G06F 8/45* (2013.01)

(58) Field of Classification Search
  None
  See application file for complete search history.

(56) References Cited

U.S. PATENT DOCUMENTS

| | | | |
|---|---|---|---|
| 2004/0216106 A1* | 10/2004 | Kalla | G06F 9/3851 718/100 |
| 2006/0212868 A1* | 9/2006 | Takayama | G06F 9/52 718/100 |
| 2012/0317582 A1* | 12/2012 | Craik | G06F 9/4881 718/104 |

FOREIGN PATENT DOCUMENTS

| | | |
|---|---|---|
| JP | 2002-99426 | 4/2002 |
| JP | 2011-134145 | 7/2011 |

* cited by examiner

*Primary Examiner* — Gregory A Kessler
(74) *Attorney, Agent, or Firm* — Staas & Halsey LLP

(57) ABSTRACT

An apparatus includes a plurality of processors and a holder unit. The plurality of processors execute a task as a unit of processing by dividing the task into multiple threads including single and parallel threads, where the single thread is executed by only one of the plurality of processors whose respective pieces of processing have reached the thread, and the parallel thread is executed in parallel with another parallel thread by the plurality of processors. The holder unit is configured to held information to be shared by the plurality of processors. Each processor executes one of the multiple threads at a time, and causes the holder unit to hold reaching-state information indicating an extent to which the multiple threads executed by the plurality of processors have reached the single thread. Each processor determines whether to execute the single thread, based on the reaching-state information held in the holder unit.

8 Claims, 18 Drawing Sheets

FIG. 13

```
#pragma omp parallel
{
            ⋮                        } PARALLEL PROCESSING BLOCK PAB
    #pragma omp single (nowait)
    {
            ⋮                        } SINGLE PROCESSING BLOCK SIB
    }
            ⋮                        } PARALLEL PROCESSING BLOCK PAB
    #pragma omp single (nowait)
    {
            ⋮                        } SINGLE PROCESSING BLOCK SIB
    }
            ⋮                        } PARALLEL PROCESSING BLOCK PAB
}
```

FIG. 14

```
#pragma omp parallel for
for(i = 0; i < COUNT; i++)
{
            ⋮                        } PARALLEL PROCESSING BLOCK PAB
    #pragma omp single (nowait)
    {
            ⋮                        } SINGLE PROCESSING BLOCK SIB
    }
            ⋮                        } PARALLEL PROCESSING BLOCK PAB
}
```

FIG. 15

```
#pragma omp parallel for
    for(i=0; i<COUNT; i++)
    {
        ....
        #pragma omp sections
        {
            #pragma omp section
            {
                ....
            }
            #pragma omp section
            {
                ....
            }
        }
    }
```

⇕

```
#pragma omp parallel for
    for(i=0; i<COUNT; i++)       } PARALLEL PROCESSING
    {                              BLOCK PAB
        ....
        #pragma omp single (nowait)
        {                         } SINGLE PROCESSING
            ....                    BLOCK SIB
        }
        #pragma omp single (nowait)
        {                         } SINGLE PROCESSING
            ....                    BLOCK SIB
        }
        #pragma omp barrier
    }
```

APPARATUS AND METHOD FOR CONTROLLING EXECUTION OF A SINGLE THREAD BY MULTIPLE PROCESSORS

CROSS-REFERENCE TO RELATED APPLICATION

This application is based upon and claims the benefit of priority of the prior Japanese Patent Application No. 2014-165172, filed on Aug. 14, 2014, the entire contents of which are incorporated herein by reference.

FIELD

The embodiment discussed herein is related to apparatus and method for controlling execution of a single thread by multiple processors.

BACKGROUND

A parallel computer including multiple processors operable in parallel enhances processing efficiency by dividing a task as a unit of processing into multiple threads and then making the multiple processors to execute the threads. A processor device, such as a central processing unit (CPU) including multiple cores, is one of parallel computers.

For a parallel computer of this type, there has been proposed a technique in which a storage area is first allocated to a thread continuously activating from the start to the end of a program, and then variables used in the other treads threads are stored in the storage area (for example, see Japanese Laid-open Patent Publication No. 2002-99426). This technique ensures that even when another thread executed in parallel ends, a variable used in the other thread is held in the storage area without being lost during the execution of the program.

Another proposed technique is that, based on a value set to a flag allocated to a main memory, a thread waits for execution of synchronous processing until execution of an instruction code by another thread completes, and executes the synchronous processing after the execution of the instruction code is completed (for example, see Japanese Laid-open Patent Publication No. 2011-134145).

SUMMARY

According to an aspect of the invention, an apparatus includes a plurality of processors and a holder unit. The plurality of processors execute a task as a unit of processing by dividing the task into multiple threads including a single thread and a parallel thread, where the single thread is a thread to be executed by only one of the plurality of processors whose respective pieces of processing have reached the thread, and the parallel thread is a thread to be executed in parallel with another parallel thread by the plurality of processors. The holder unit is configured to held information to be shared by the plurality of processors. Each of the plurality of processors executes one of the multiple threads at a time, and causes the holder unit to hold reaching-state information indicating an extent to which the multiple threads executed by the plurality of processors have reached the single thread. Each processor determines whether to execute the single thread, based on the reaching-state information held in the holder unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of a program executed by a plurality of processors, according to an embodiment;

FIG. 14 is a diagram illustrating an example of a program executed by a plurality of processors, according to an embodiment;

FIG. 15 is a diagram illustrating an example of a program executed by a plurality of processors, according to an embodiment;

DESCRIPTION OF EMBODIMENT

Figure 1:
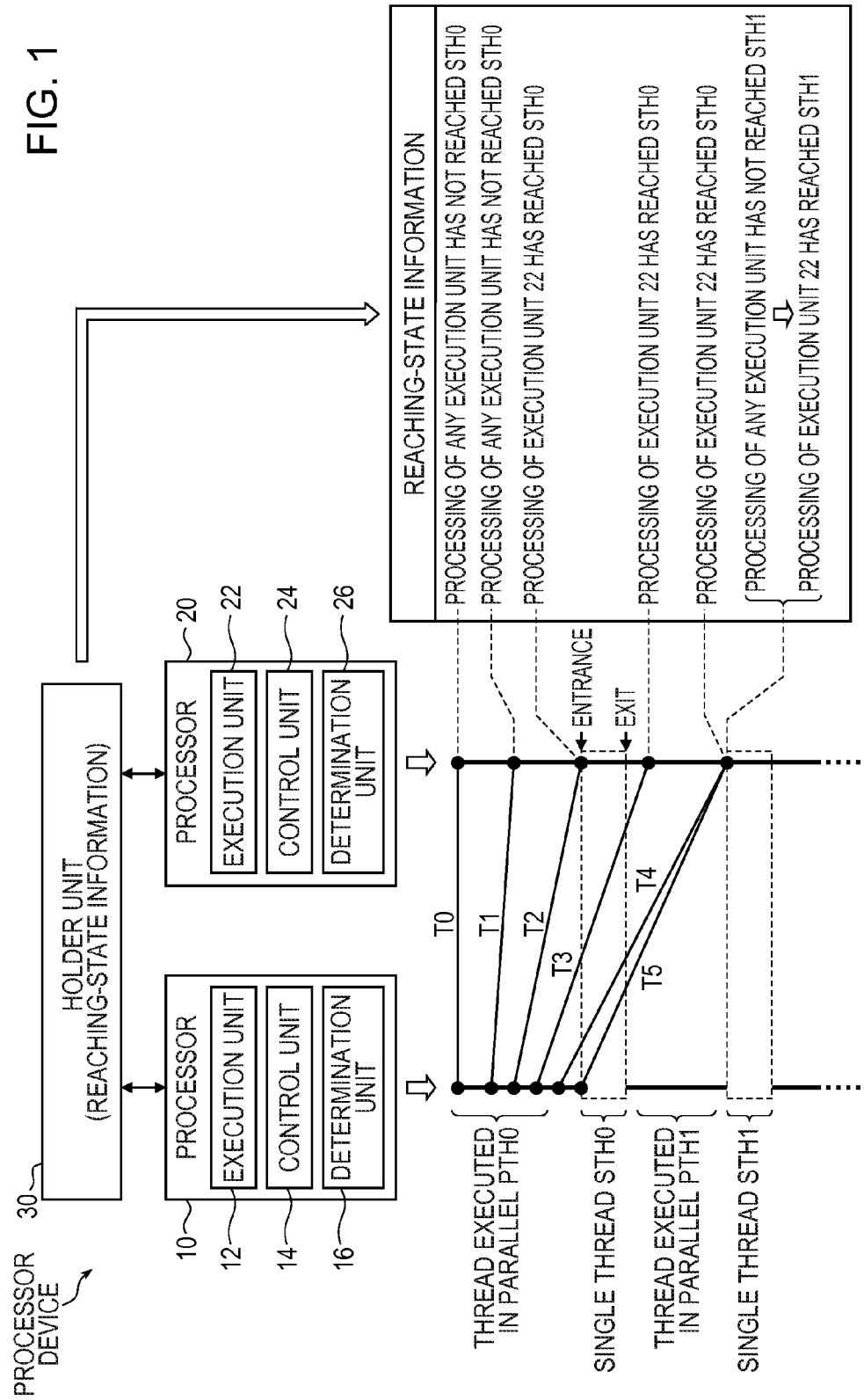
FIG. 1 is a diagram illustrating an example of a method for controlling a plurality of processors, according to an embodiment.

A storage area used by multiple threads is allocated to an external storage device such as a main memory in order to enable access from multiple threads. For this reason, the number of cycles for access to the storage area is larger than the number of cycles for access to a register provided in a processor device, and thereby the access efficiency is low. As a result, processing efficiency during execution of multiple threads in parallel may be lowered.

Hereinafter, embodiments are described with reference to the accompanying drawings. A signal line for transmitting a signal is described by using a reference numeral same as a signal name.

FIG. 1 is a diagram illustrating an example of a processor device and a method of controlling the processor device, according to an embodiment. The processor device illustrated in FIG. 1 includes multiple processors 10, 20, and a holder unit 30. The processor 10 includes an execution unit 12, a control unit 14, and a determination unit 16, and the processor 20 includes an execution unit 22, a control unit 24, and a determination unit 26. For example, the processor device is a CPU, and the processors 10, 20 are cores mounted in the CPU.

The execution units 12, 22 may execute multiple threads in parallel, or a single thread alone. The holder unit 30 is shared by both of the processors 10, 20, and is configured to hold reaching-state information indicating an extent to which processing executed by the execution units 12, 22 has reached a single thread STH (STH0 or STH1). The single thread STH is a thread exclusively executed only by any one of the execution units 12, 22. For example, when the execution unit 12 of the processor 10 executes a single thread STH, the execution unit 22 of the other processor 20 skips the single thread STH without executing. In the example illustrated in FIG. 1, the holder unit 30 holds reaching-state information corresponding to one single thread STH.

Each of the control units 14, 24 stores reaching-state information into the holder unit 30 when processing of execution units 12, 22 reach an entrance of the single thread STH. Each of the determination units 16, 26 determines based on the reaching-state information held by the holder unit 30 whether to cause execution units 12, 22 to execute the single thread.

Lower part of FIG. 1 illustrates that after a thread PTH0 is executed by execution units 12, 22 in parallel, a single thread STH0 is executed by the execution unit 22, and further after a thread PTH1 is executed by execution units 12, 22 in parallel, a single thread STH1 is executed by the execution unit 22. Reference numerals T0, T1, T2, T3, T4, and T5 represent time, indicating that processing by the execution unit 22 is faster than processing by the execution unit 12.

At times T0, T1, processing of both the execution units 12, 22 has not reached an entrance of a single thread STH0. Therefore, the holder unit 30 holds reaching-state information indicating "no execution unit whose processing has reached the single thread STH0".

At a time T2, processing executed by the execution unit 22 reaches the entrance of the single thread STH0, and the control unit 24 stores reaching-state information indicating "processing of the execution unit 22 has reached the single thread STH0" into the holder unit 30. Since the holder unit 30 is provided in the processor device, time for storing the reaching-state information is shorter than time for storing reaching-state information into an external storage device of the processor device. The determination unit 26 of the processor 20 including the execution unit 22 whose processing has reached the entrance of the single thread STH0 causes the execution unit 22, based on the reaching-state information for the single thread STH0 held by the holder unit 30, to execute the single thread STH0. Next, at a time T3, the execution unit 12 executes a thread PTH0, and the execution unit 22 executes a thread PTH1.

At a time T4, processing executed by the execution unit 22 reaches an entrance of a single thread STH1. However, reaching-state information held by the holder unit 30 indicates "processing of the execution unit 22 has reached the single thread STH0" (that is, processing of the execution unit 12 has not yet reached an entrance of the single thread STH0). Since reaching-state information which the holder unit 30 is able to hold is information corresponding to one single thread STH, the control unit 24 of the processor 20 does not store reaching-state information indicating "processing of the execution unit 22 has reached the single thread STH1" into the holder unit 30. Since reaching-state information for the single thread STH1 is not held by the holder unit 30, the determination unit 26 of the processor 20 determines to suspend execution of the single thread STH1 by the execution unit 22.

That is, the determination unit 26 detects that before processing executed by the execution unit 12 reaches the entrance of the single thread STH0, processing executed by the execution unit 22 has reached the entrance of the single thread STH1 executed after the single thread STH0. Then, when the holder unit 30 has no area to store reaching-state information corresponding to the single thread STH1, the execution unit 22 suspends execution of the single thread STH1.

Next, at a time T5, processing executed by the execution unit 12 reaches the entrance of the single thread STH0. The determination unit 16 of the processor 10 determines by referring to reaching-state information held by the holder unit 30 that entire processing of execution units 12, 22 has reaches the entrance of the single thread STH0. The determination unit 16 detects, based on reaching-state information held by the holder unit 30, that the execution unit 22 of the other processor 20 has executed the single thread STH0, and causes processing executed by the execution unit 12 to jump from the entrance of the single thread STH0 to the exit thereof. Thus, execution of the single thread STH0 by the execution unit 12 is skipped.

Time for referring to the reaching-state information is shorter than time for referring to reaching-state information held by an external storage device of the processor device. Then, the control unit 14 of the processor 10 initializes reaching-state information held by the holder unit 30 to "no execution unit whose processing has reached the single thread STH1".

Then, referring to reaching-state information held by the holder unit 30, the control unit 24 of the processor 20 stores reaching-state information indicating "processing of execution unit 22 has reached the single thread STH1" into the holder unit 30, since reaching-state information for the single thread STH1 is held therein. Then, the determination unit 26 of the processor 20 causes the execution unit 22, based on the reaching-state information for the single thread STH1 held by the holder unit 30, to execute the single thread STH1.

In the embodiment illustrated in FIG. 1, since the processor device includes the holder unit 30 for holding reaching-state information, time for access to reaching-state information may be reduced compared with reaching-state information stored in an external storage device of the processor device. Access time used herein refers to a storage time for storing reaching-state information into the holder unit 30, and a read time for reading reaching-state information from the holder unit 30. This enables processors 10, 20 to reduce a time for storing reaching-state information indicating reach of the single thread STH0 (or STH1) into the holder unit 30, and a time for determining the propriety of executing the single thread STH0 (or STH1). Thus, processing efficiency of threads PTH0, STH0, PTH1, and STH1 may be improved.

When the holder unit 30 does not hold reaching-state information indicating "processing of the processor 20 has reached the single thread STH1", the determination unit 26 of the processor 20 determines to hold execution of the single thread STH1 by the execution unit 22. When an area for storing new reaching-state information is not available in the holder unit 30, propriety of executing the single thread STH may be controlled according to a storage capacity of the holder unit 30 by suspending execution of the single thread STH1.

Figure 2:
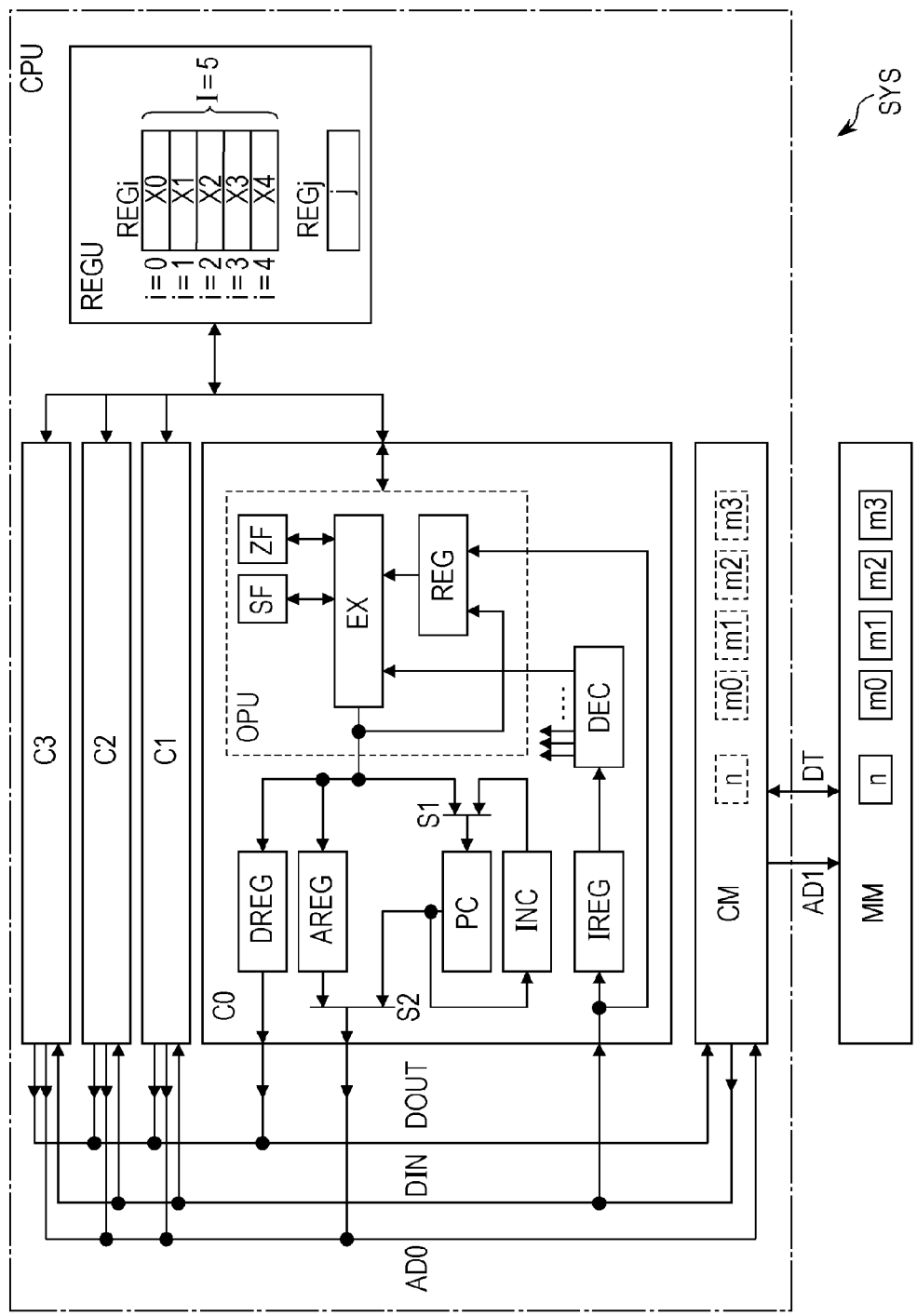
FIG. 2 is a diagram illustrating an example of a configuration of a plurality of processors, according to an embodiment.

FIG. 2 is a diagram illustrating an example of a processor device and a method of controlling the processor device, according to an embodiment. The CPU illustrated in FIG. 2 includes multiple cores C (C0, C1, C2, and C3), a cash memory CM, and a register unit REGU. Since cores C are the same to each other or of the same configuration, FIG. 2 illustrates a configuration of a core C0 as an representable example, and hereinafter, the configuration of the core C0 is described. The number of cores is not limited to four. The CPU is an example of the processor device, and the core C is an example of the processor. The CPU is connected to a main memory MM, and an information processing system SYS comprises the CPU and the main memory MM.

The core C0 includes an operation unit OPU, a data register unit DREG, an address register unit AREG, a program counter PC, an incrementer INC, an instruction register unit IREG, a decoder unit DEC, and selectors S1, S2. The operation unit OPU includes a register file REG, an arithmetic unit EX, and a flag registers SF, ZF. The operation unit OPU is an example of an execution unit for executing a thread.

The program counter PC outputs an address received from the selector S1 to the incrementer INC, and the selector S2. The incrementer INC increments an address received from the program counter PC, and outputs the incremented address to the selector S1.

The selector S1 selects an address from the incrementer INC when sequentially fetching instruction codes, and selects an address from the operation unit OPU when a branch instruction, a jump instruction, or the like is executed. The selector S1 outputs a selected address to the program counter PC. The selector S2 selects an address outputted from the program counter PC when fetching an instruction code, and selects an address outputted from the address register unit AREG when executing a load instruction or a store instruction. The selector S2 outputs the selected address to the cache memory CM via the address bus AD0.

When the core C0 fetches an instruction, an instruction code is read from the cache memory CM according to the address bus AD0, and a read instruction code is stored into the instruction register unit IREG via the data bus DIN. When the instruction code is not held in the cache memory, the cache memory CM outputs an address to the main memory MM via the address bus AD1, and receives the instruction code from the main memory MM via the data bus DT. For example, the address AD1 is a high-order address of the address AD0, and the instruction code (program) corresponding to one cache line of the cache memory CM is read from the main memory MM. Then, the cache memory CM holds the instruction code read from the main memory MM, and outputs the read target instruction code out of held instruction codes to the instruction register unit IREG via the data bus DIN.

When the core C0 executes a load instruction, data is read from the cache memory CM according to the address bus AD0, and a read data is stored into the register file REG via the data bus DIN. When target data of the load instruction is not held in the cache memory CM, the cache memory CM reads data corresponding to one cache line from the main memory MM in a manner similar to the reading of the instruction code. Then, the cache memory CM holds the data read from the main memory MM, and outputs a load target data out of the held data to the register file REG via the data bus DIN.

When the core C0 executes a store instruction, data outputted from the data register unit DREG to the data bus DOUT is written into the cache memory CM according to an address outputted to the address bus AD0.

The instruction register unit IREG has multiple areas for holding instruction codes received from the cache memory CM, and outputs the held instruction codes sequentially to the decoder unit DEC. The decoder unit DEC decodes the instruction codes received from the instruction register unit IREG, and, based on the decoding results, generates control signals for controlling operations of the operation unit OPU, selectors S1, S2, and so on.

The data register unit DREG includes multiple areas for holding data outputted from the operation unit OPU during execution of the store instruction. The address register unit AREG includes multiple areas for holding addresses outputted from the operation unit OPU during execution of the load instruction or store instruction.

The register file REG includes multiple registers for holding data read from the cache memory CM, or data outputted from the arithmetic unit EX. Based on a control signal from the decoder unit DEC, the register file REG outputs data held in at least one of the multiple registers of the register file REG to the arithmetic unit EX.

The arithmetic unit EX executes operation in accordance with an instruction code decoded by the decoder unit DEC, and outputs operation results to the register file REG, data register unit DREG, address register unit AREG, or selector S1. The arithmetic unit EX sets or resets flag registers SF, ZF based on the operation results, and refers to values of the flag registers SF, ZF when executing the logical operation instruction or branch instruction. The operation unit OPU may include a flag register other than flag registers SF, ZF.

Figure 9:
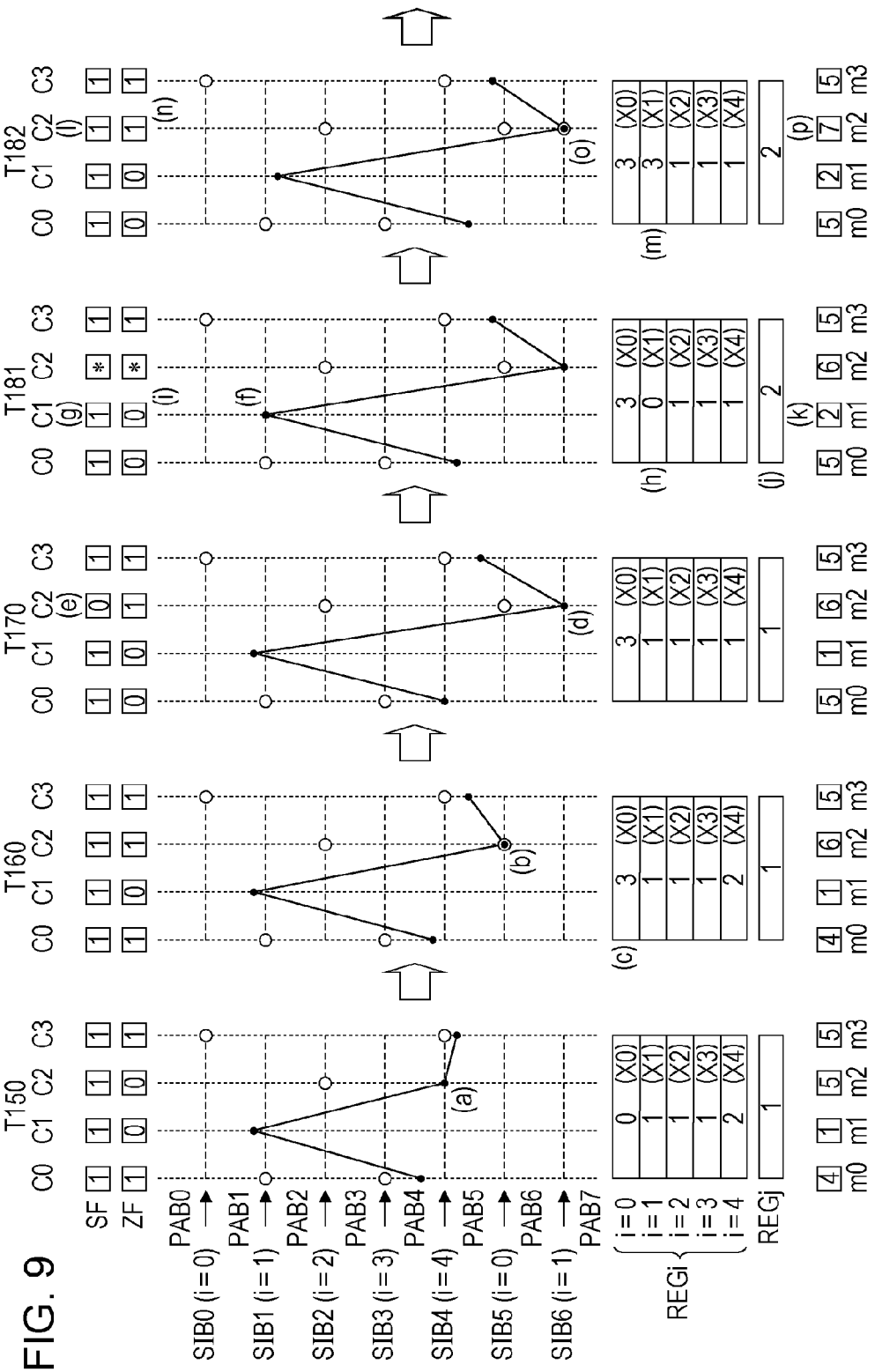

The register unit REGU includes multiple registers REGi (i represents any one of 0, 1, 2, 3, and 4), and registers REGj. Here, I, the number of storage areas of the register REGi, is not limited to "5", but may be any number greater than or equal to "1". However, as illustrated in FIG. 9 and the like, larger the number I of storage areas of the registers REGi, larger the number of parallel processes performed by the multiple cores C, thereby improving the processing efficiency of the CPU. The register unit REGU is an example of the holder unit for holding reaching-state information indicating that processing executed by each of cores C0 to C3 has reached an entrance of the single processing block SIB.

In FIG. 2, a value held by each of registers REGi is represented by a reference numeral Xi (any one of X0 to X4). For example, a bit width of each of registers REGi and a bit width of the register REGj are equal to each other.

Figure 5:
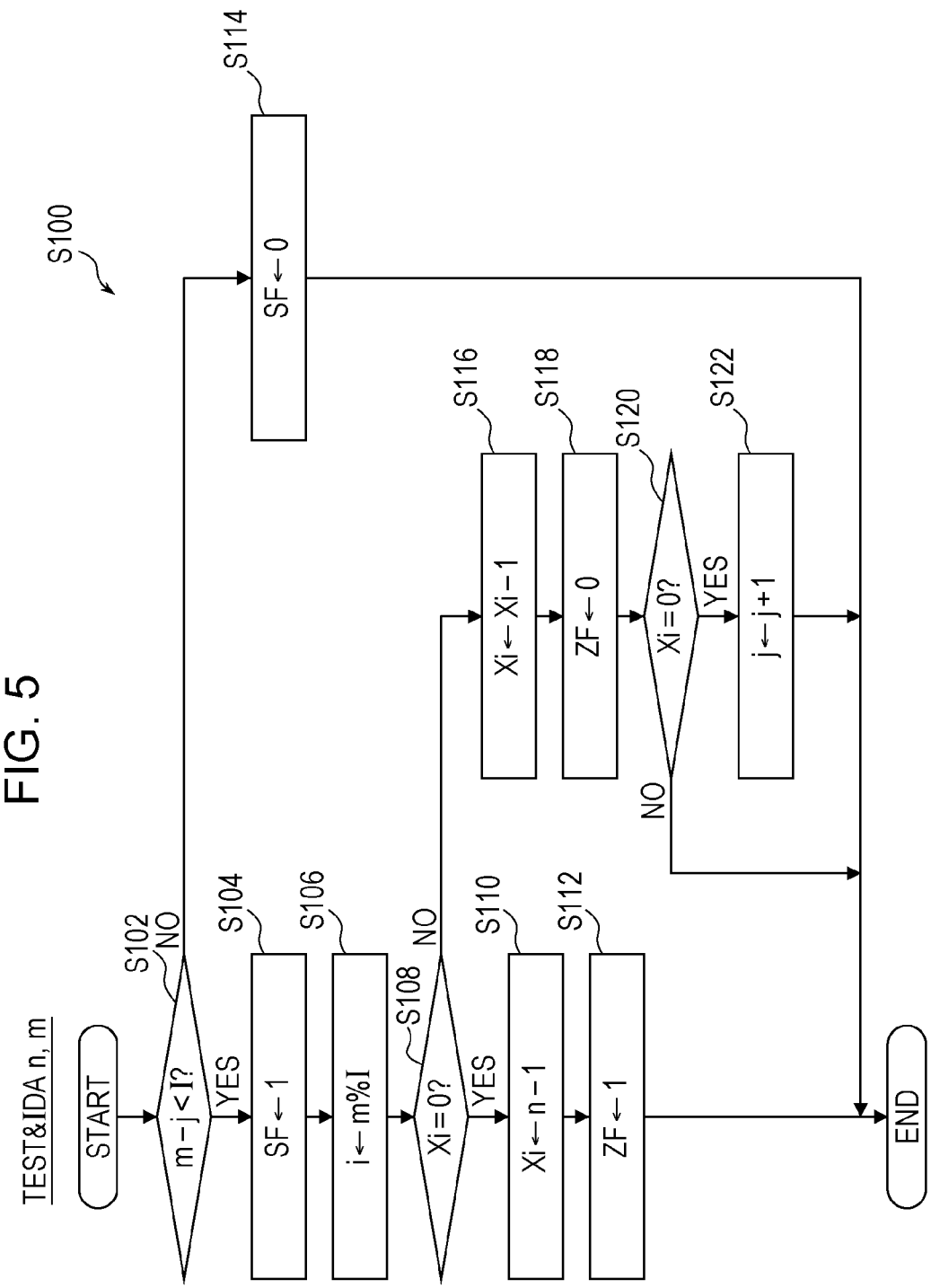
FIG. 5 is a diagram illustrating an example of an operational flowchart for processing executed by an instruction code TEST&IDA, according to an embodiment.

Registers REGi, REGj are accessed when each of cores C0 to C3 executes the instruction code TEST&IDA (TEST & Increment, Decrement and Assignment) which will be illustrated in FIG. 5. Registers REGi are used cyclically as processing illustrated in FIG. 3 proceeds, and each of registers REGi store an unreached-thread count Xi indicating the number of threads THs which have not reached the entrance of the single processing block SIB illustrated in FIG. 3. A value obtained by subtracting the unreached-thread count Xi from the number of cores C0 to C3 (=4) indicates the number of threads THs which have reached the entrance of the single processing block SIB. In other words, the unreached-thread count Xi may be regarded as an example of reached-processor count information indicating the number of cores C0 to C3 whose respective pieces of processing have reached the entrance of the single processing block SIB. Each of registers REGi may store the number of threads THs which have reached the entrance of the single processing block SIB. In registers REGi of the register unit REGU, each area where the unreached-thread count Xi is stored is an example of a reached-processor count area.

The register REGj stores a total passing count j which represents the total number of single processing blocks SIBs through which all the threads THs have passed. The total passing count j is an example of total passing count information indicating the number of single processing blocks SIBs through which processing of all the cores C0 to C3 has passed. The register REGj is an example of total passing count area for holding the total passing count information. Usage of registers REGi, REGj are described with reference to FIG. 5 to FIG. 12.

The instruction code TEST&IDA is processed when the microprogram is executed by the arithmetic unit EX, in a manner similar to the addition instruction, multiplication instruction, load instruction, and store instruction. Operation of the arithmetic unit EX executing the instruction code TEST&IDA may be implemented by a wired logic. However, by employing the microcode, the instruction code TEST&IDA may be added easily compared with the wired logic system, and a hardware function (architecture of instruction set) may be easily modified.

The cache memory CM operates as an instruction cache and a data cache. The cache memory CM may be provided for each of cores C, and may include a primary cache and a secondary cache. The main memory MM is a memory module, such as a synchronous dynamic random access memory (SDRAM) or a flash memory, and stores a program executed by the CPU and data handled by the CPU. The main memory MM includes a storage area for holding a core number n indicating the number of cores C, and a storage area for holding passing counts m (m0, m1, m2, m3) indicating the number of single processing blocks SIBs, illustrated in FIG. 3, through which respective pieces of processing of cores C0 to C3 have passed. The core number n and the passing count m are held in the cache memory CM as well. In the case where the cache memory CM holds the core number n and the passing count m, each of cores may refer to the core number n and the passing count m, and rewrite the passing count m, just by accessing to the cache memory CM without accessing to the main memory MM.

Figure 3:
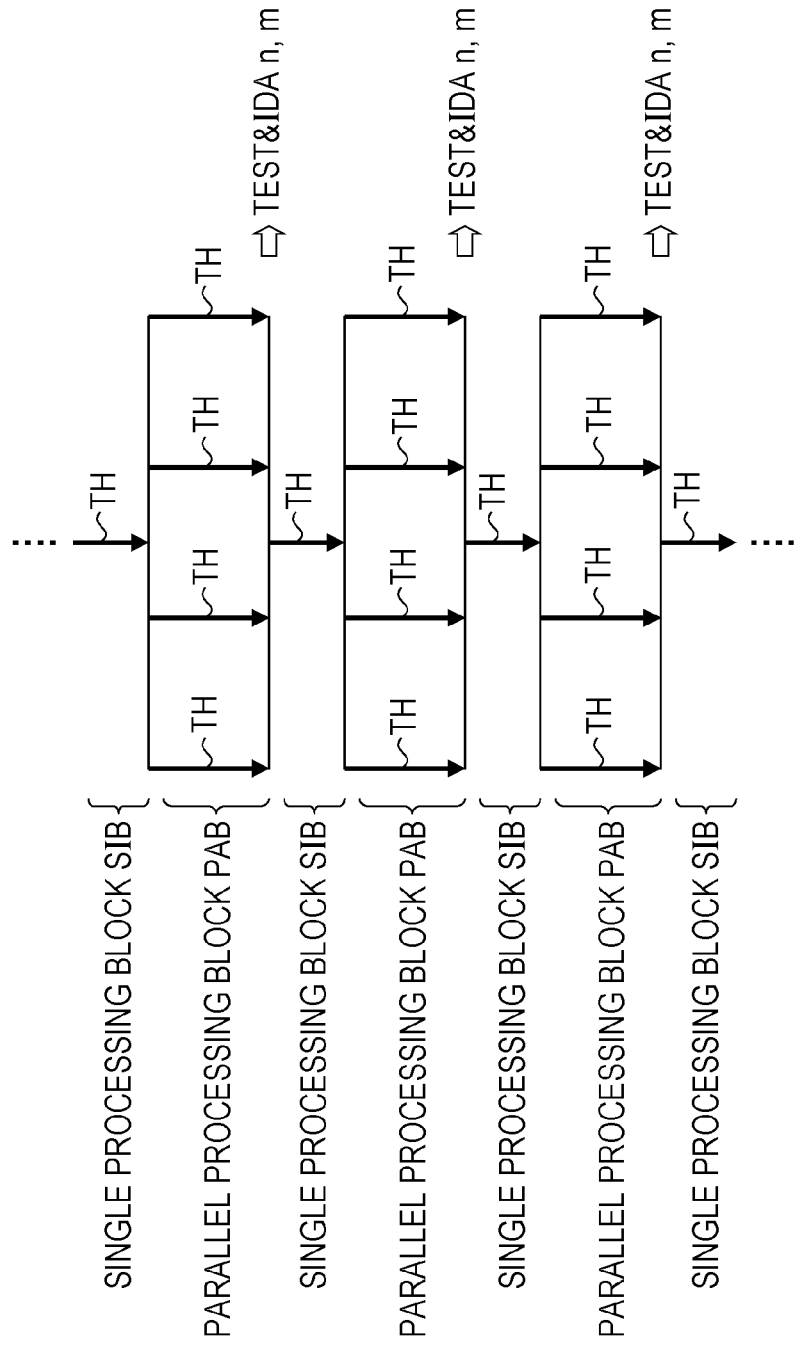
FIG. 3 is a schematic diagram illustrating an example of processing executed by a plurality of processors, according to an embodiment.

FIG. 3 is a diagram illustrating an example of processing executed by a CPU, according to an embodiment, where the CPU is, for example, one illustrated in FIG. 2. In the example illustrated in FIG. 3, each of cores C0 to C3 executes multiple threads TH in parallel (parallel processing block PAB), and any one of cores C0 to C3 executes a thread TH being a single thread (single processing block SIB). The single thread is a thread exclusively executed only by any one of cores C0 to C3. Although FIG. 3 illustrates a case where the single processing block SIB and the parallel processing block PAB are repeated alternately, a predetermined number of single processing blocks SIBs or a predetermined number of parallel processing blocks PABs may be executed consecutively. Since each of cores C0 to C3 illustrated in FIG. 2 has a function of executing one thread TH, a thread TH illustrated in FIG. 3 may be also denoted as a core C (which executes the thread TH).

The single processing block SIB is a processing block that is executed by one thread at a time. Except when there is no free space in the register REGi illustrated in FIG. 2, a thread TH executing the single processing block SIB may execute the single processing block SIB without waiting for completion of the parallel processing block PAB by the other thread TH. The thread TH executing the single processing block SIB is an example of the single thread which is a thread executed only by any one of multiple cores C0 to C3.

Upon reaching the entrance of the single processing block SIB, each thread TH executes the instruction code TEST&IDA. "n" and "m" of the instruction code TEST&IDA are operands (variables), respectively representing the core number n and the passing count m held in the main memory MM or the cache memory CM.

Figure 4:
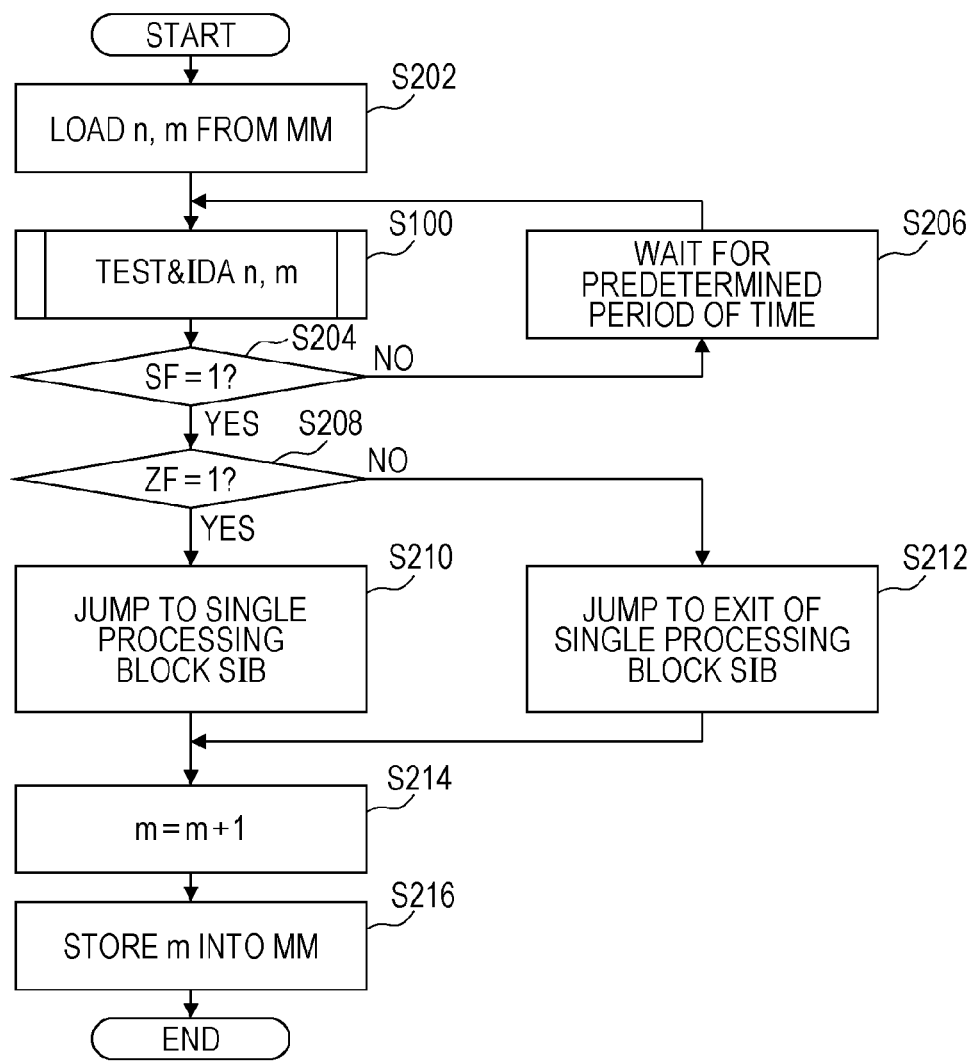
FIG. 4 is a diagram illustrating an example of an operational flowchart for processing executed by each of a plurality of processors at an entrance of a single processing block, according to an embodiment.

Based on values of flag registers SF, ZF that are set by execution of the instruction code TEST&IDA, each thread TH determines whether to execute the single processing block SIB or pass the single processing block SIB without executing the same. An example of determination processing executed by each thread TH is illustrated in FIG. 4. Examples of the single processing block SIB and the parallel processing block PAB are illustrated in FIG. 13 to FIG. 15.

FIG. 4 is a diagram illustrating an example of processing that is executed by a core at an entrance of a single processing block, according to an embodiment. FIG. 4 illustrates an example of processing that is executed by each of cores C illustrated in FIG. 2 at the entrance of the single processing block SIB. FIG. 4 is a flowchart illustrating a content of an object program obtained by compiling a source program. That is, the processing illustrated in FIG. 4 is implemented when the operation unit OPU of each of cores C executes an object program stored in the main memory MM. The operation unit OPU of each of cores C executing the processing illustrated in FIG. 4 is an example of a determination unit which determines execution of the single processing block SIB based on the unreached-thread count Xi and the total passing count j held in the register unit REGU.

Upon reaching the entrance of the single processing block SIB, cores C execute, in the step S202, a load instruction to load the core number n and the passing count m from the main memory MM. When the cache memory CM holds the core number n and the passing count m, the core number n and the passing count m are read from the cache memory CM.

Next, in the step S100, cores C execute the instruction code TEST&IDA with the core number n and the passing count m loaded from the main memory MM as variables. An example of the processing executed by the instruction code TEST&IDA is illustrated in FIG. 5.

Next, in the step S204, when the value of the flag register SF after execution of the instruction code TEST&IDA is "1", cores C determines that there is an available register in the registers REGi, and causes the processing to shift to the step S208. When the value of the flag register SF after execution of the instruction code TEST&IDA is not "1" (that is, "0"), cores C determines that there is no available register in the registers REGi, and causes the processing to shift to the step S206.

In the step S206, cores C return the processing to the step S100 after waiting for a predetermined period of time. In the step S206, cores C may execute the other processing while waiting for the predetermined period of time.

In the step S208, when the value of the flag register ZF after execution of the instruction code TEST&IDA is "1", the core C determines that the core C has first reached the entrance of the single processing block SIB, and causes the processing to shift to the step S210. When the value of the flag register ZF after execution of the instruction code TEST&IDA is not "1" (that is, "0"), the core C determines that the other thread has reached the entrance of the single processing block SIB earlier, and causes the processing to shift to the step S212.

In the step S210, processing of the core C jumps to the single processing block SIB, and the core C executes the single processing block SIB. In the step S212, processing of the core C jumps to the exit of the single processing block SIB, and the core C starts next processing without executing the single processing block SIB. That is, the core C determines not to execute the single processing block SIB, and jumps the processing to the exit of the single processing block SIB. This inhibits the single processing block SIB from being executed by multiple cores C, and also suppresses malfunction of the CPU. After execution of steps S210 and S212, the processing is shifted to the step S214.

In the step S214, the core C increments the passing count m loaded from the main memory MM in the step S202 by "1". Next, in the step S216, the core C executes the store instruction to store the passing count m incremented in the step S214 into the main memory MM. When the cache memory CM holds a passing count m, the passing count m incremented in the step S214 is stored into the cache memory CM and thereafter stored into the main memory MM. Then, the processing executed by the core C ends.

FIG. 5 is a diagram illustrating an example of processing executed by an instruction code TEST&IDA, according to an embodiment. The processing illustrated in FIG. 5 is implemented when the arithmetic unit EX illustrated in FIG. 2 executes a microprogram corresponding to the instruction code TEST&IDA. The arithmetic unit EX executing the instruction code TEST&IDA illustrated in FIG. 5 is an example of the control unit which stores the unreached-thread count Xi or the total passing count j into the register REGU when the processing has reached the entrance of the single processing block SIB.

In the step S102, when a difference between the passing count m and the total passing count j is smaller than I indicating the number of registers REGi ("5" in FIG. 2), there is an available register REGi. Therefore, the arithmetic unit EX causes the processing to shift to the step S104. When the difference between the passing count m and the total passing count j is equal to or larger than I indicating the number of registers REGi, there is no available register REGi. Therefore, the arithmetic unit EX causes the processing to shift to the step S114.

In the step S104, the arithmetic unit EX sets the flag register SF at "1" to indicate that the processing has reached the entrance of the single processing block SIB, and then causes the processing to shift to the step S106. In the step S106, the arithmetic unit EX calculates a remainder i ("m % I") by dividing the passing count m by I indicating the number of registers REGi, as the number i that is assigned to a register REGi to be used, and causes the processing to shift to the step S108.

In the step S108, when the unreached-thread count Xi stored in the register REGi, whose number i is obtained in the step S106, is "0", the arithmetic unit EX determines that the processing has first reached the entrance of the single processing block SIB, and causes the processing to shift to the step S110. On the other hand, when the unreached-thread count Xi is not "0", the arithmetic unit EX determines that processing of the other core C has reached the entrance of the single processing block SIB, and causes the processing to shift to the step S116.

In the step S110, the arithmetic unit EX stores a value obtained by subtracting "1" from the core number n ("4" in FIG. 2) into the register REGi as the unreached-thread count Xi, and causes the processing to shift to the step S112. In the step S112, the arithmetic unit EX sets the flag register ZF at "1" to indicate that the processing has first reached the entrance of the single processing block SIB, and ends the processing.

When processing of the other core C has reached the entrance of the single processing block SIB, the arithmetic unit EX reduces the unreached-thread count Xi by "1" in the step S116, and causes the processing to shift to the step S118. In the step S118, the arithmetic unit EX resets the flag register ZF at "0" to indicate that the processing has failed to first reach the entrance of the single processing block SIB, and causes the processing to shift to the step S120.

In the step S120, when the unreached-thread count Xi is "0", the arithmetic unit EX determines that the processing has last reached the entrance of the single processing block SIB, and causes the processing to shift to the step S122. When the unreached-thread count Xi is not "0", the arithmetic unit EX determines that there is a Core C whose processing has not yet reached the entrance of the single processing block SIB, and ends the processing. In the step S122, since the processing of all cores C has reached the entrance of the single processing block SIB, the arithmetic unit EX increments the total passing count j by "1", and ends the processing.

On the other hand, when there is no available register REGi, the arithmetic unit EX sets the flag register SF at "0" to artificially indicate that the processing has not reached the entrance of the single processing block SIB (although already having reached actually) in the step S114, and ends the processing.

Thus, the processing of steps S110 and S112 is performed by a core C whose processing has first reached the entrance of the single processing block SIB. The processing of steps S116 to S122 is performed by a core C whose processing has reached the entrance of the single processing block SIB secondly or later. Further, the processing of the step S122 is performed by a core C whose processing has last reached the entrance of the single processing block SIB. The step S114 is processing executed by a core C when there is no free space in the register REGi.

FIGS. 6 to 10 are diagrams illustrating an example of an operation of a CPU illustrated in FIG. 2, according to an embodiment. In the operation illustrated in FIGS. 6 to 10, the single processing block SIB and the parallel processing block PAB are executed alternately in a manner similar to the operation illustrated in FIG. 3.

The mark "*" of flag registers SF, ZF represents "0" or "1". A broken line pointed by arrow represents a single processing block (SIB0 to SIB6), and a section above or below the single processing block represents a parallel processing block PAB (PAB0 to PAB6). A number i of the register REGi illustrated along with single processing blocks SIB0 to SIB6 is calculated in the step S106 illustrated in FIG. 5, and is cyclically allocated to any one of "0" to "4".

Processing executed by each of cores C proceeds from above downward in FIGS. 6 to 10. A small black circle illustrated on a progression line (dotted line in a vertical direction of the figures) of each of cores C indicates a position of processing. A polygonal line connecting small black circles with each other indicates an arbitrary time in a manner similar to FIG. 1, the time being provided for convenience sake to easily recognize a difference in the progress status of the processing executed by each of cores C. A white circle on a broken line illustrating the single processing block SIB indicates that a core C, which has first reached the entrance of the single processing block SIB, has executed the single processing block SIB.

First, at a time T0, each of cores C0 to C3 starts the parallel processing block PAB0. In the initialized state, registers REGi, REGj, and passing counts m0 to m3 are initialized.

Figure 6:
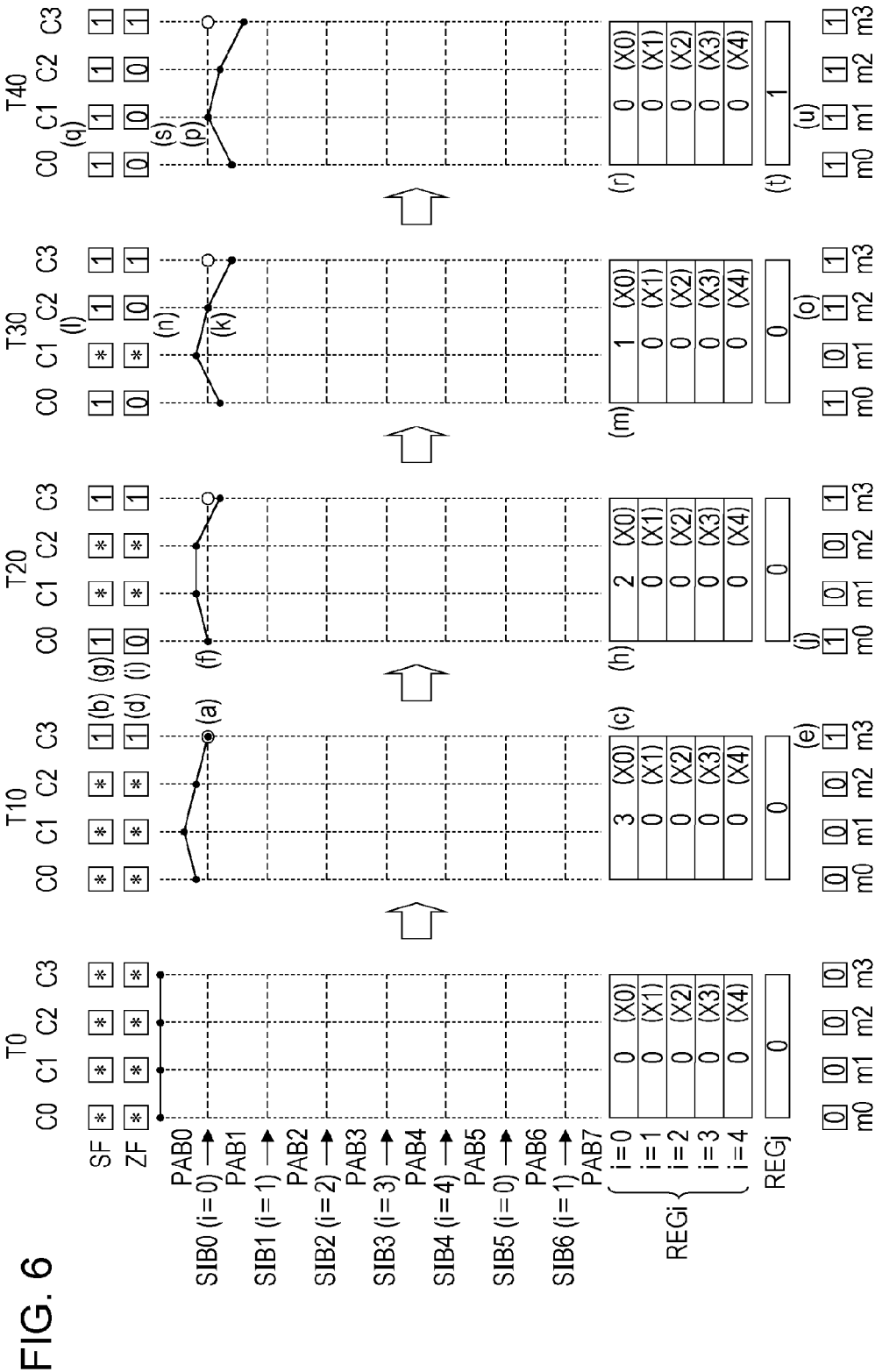
FIGS. 6 to 10 are diagrams illustrating an example of a sequence of operations performed by a plurality of processors, according to an embodiment.

At a time T10, the core C3 completes execution of the parallel processing block PAB0, first reaches the entrance of the single processing block SIB0, and executes the instruction code TEST&IDA ((a) in FIG. 6). Before the processing of the core C3 reaches the entrance of the single processing block SIB, the passing count m3 and the total passing count j are "0", and "m3−j (=0)" is smaller than the number I ("4") of the register REGi. Thus, in the step S102 illustrated in FIG. 5, the register REGi is determined to have a free space, and the flag register SF is set at "1" in the step S104 illustrated in FIG. 5 ((b) of FIG. 6).

Since the unreached-thread count X0 of the register REGi is initialized to "0" before the processing reaches the entrance of the single processing block SIB0, the processing of the core C3 is determined to have first reached the entrance of the single processing block SIB. Thus, in the step S110 illustrated in FIG. 5, the unreached-thread count X0 is set at "3" (core number −1), and the flag register ZF is set at "1" in the step S112 ((c) and (d) of FIG. 6).

After executing the instruction code TEST&IDA, the core C3 causes the processing, in the step S210 illustrated in FIG. 4, to jump to the single processing block SIB, since flag registers SF and ZF are "1". In steps S214 and S216 illustrated in FIG. 4, the core C3 increments the passing count m3, and stores the incremented passing count m3 into the main memory MM ((e) of FIG. 6). After executing the single processing block SIB0, the core C3 executes a parallel processing block PAB1.

Next, at a time T20, the core C0 completes execution of the parallel processing block PAB0, reaches the entrance of the single processing block SIB0 in second place, and executes the instruction code TEST&IDA ((f) of FIG. 6). Similarly with the operation of the core C3 at the time T10, the core C0 sets the flag register SF at "1" ((g) of FIG. 6). Since the unreached-thread count X0 of the register REGi is set at "3" at the time T10, the core C0 changes, in steps S116 and S118 illustrated in FIG. 5, the unreached-thread count X0 to "2" and resets the flag register ZF to "0" ((h) and (i) of FIG. 6).

After executing the instruction code TEST&IDA, the core C0 causes the processing, in the step S212 illustrated in FIG. 4, to jump to the exit of the single processing block SIB0, since the flag register SF is "1", and the flag register ZF is "0". In steps S214 and S216 illustrated in FIG. 4, the core C0 increments the passing count m0, and stores the incremented passing count m0 into the main memory MM ((j) of FIG. 6). After executing the single processing block SIB0, the core C0 executes the parallel processing block PAB1.

Next, at a time T30, the core C2 completes execution of the parallel processing block PAB0, reaches the entrance of the single processing block SIB0 in the third place, and executes the instruction code TEST&IDA ((k) of FIG. 6). Similarly with the operation of the core C0 at the time T20, the core C2 sets the flag register SF at "1", changes the unreached-thread count X0 to "1", and resets the flag register ZF to "0" ((l), (m), and (n) of FIG. 6). Then, after executing the instruction code TEST&IDA, the core C2 causes the processing to jump to the exit of the single processing block SIB0, increments the passing count m2, and stores the incremented passing count m2 into the main memory MM ((o) of FIG. 6). After executing the single processing block SIB0, the core C2 executes the parallel processing block PAB1.

Next, at a time T40, the core C1 completes execution of the parallel processing block PAB0, reaches the entrance of the single processing block SIB0 in the last place, and executes the instruction code TEST&IDA ((p) of FIG. 6).

Similarly with the operation of the core C0 at the time T20, the core C1 sets the flag register SF at "1", changes the unreached-thread count X0 to "0", and resets the flag register ZF to "0" ((q), (r), and (s) of FIG. 6). Further, since the unreached-thread count X0 becomes "0", the core C1 increments the total passing count j to "1" in the step S122 illustrated in FIG. 5 ((t) of FIG. 6). Then, after executing the instruction code TEST&IDA, the core C1 causes the processing to jump to the exit of the single processing block SIB1, increments the passing count m1, and stores the incremented passing count m1 into the main memory MM ((u) of FIG. 6).

Figure 7:
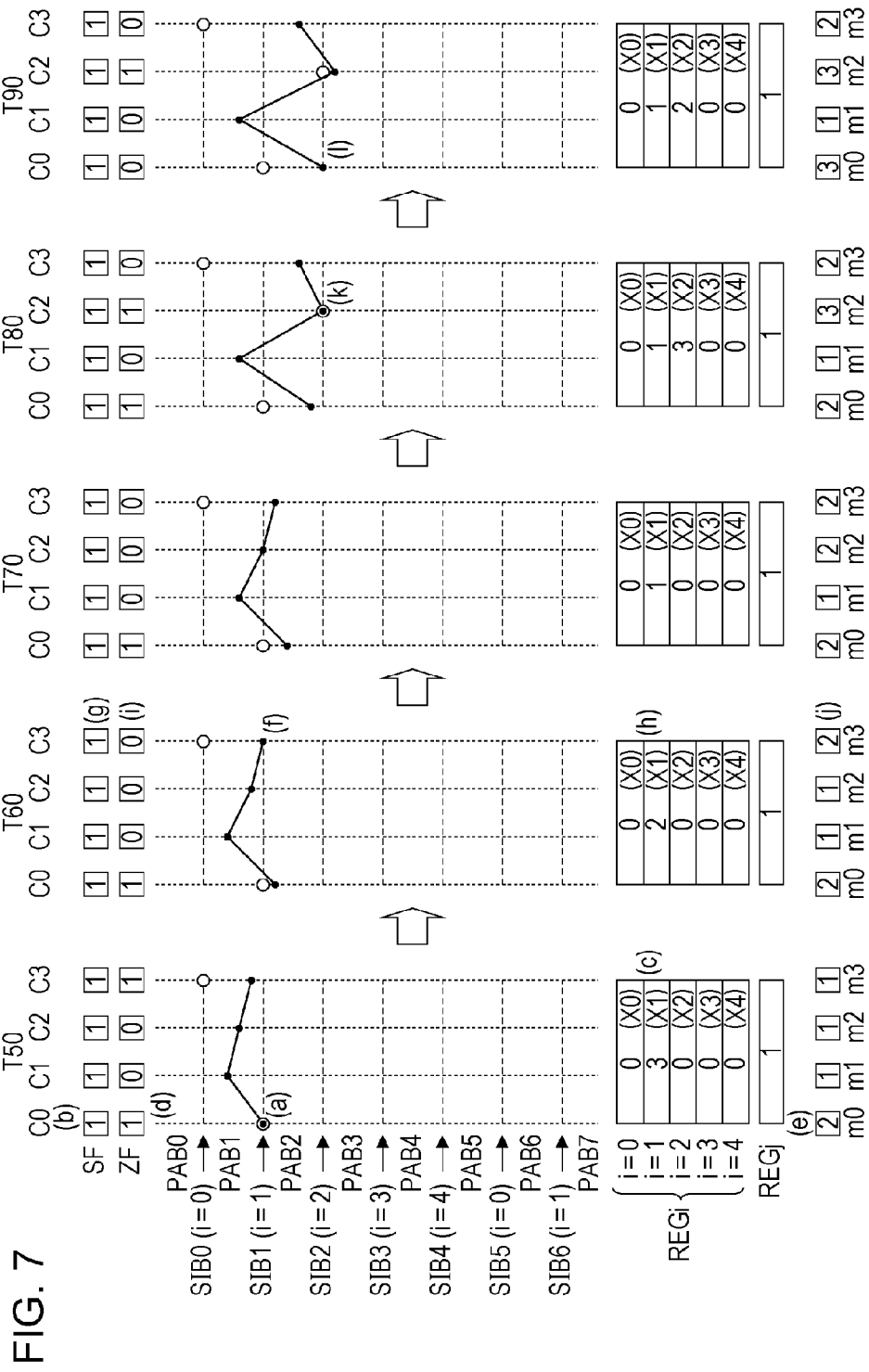

Next, at a time T50 of FIG. 7, the core C0 completes execution of the parallel processing block PAB1, reaches the entrance of the single processing block SIB1 in the first place, and executes the instruction code TEST&IDA ((a) of FIG. 7). Similarly with the time T10, since the register REGi is determined to have a free space, the flag register SF is set at "1" ((b) of FIG. 7).

Since the unreached-thread count X1 of the register REGi is initialized to "0" before the processing reaches the entrance of the single processing block SIB1, the processing of the core C0 is determined to have reached the entrance of the single processing block SIB in the first place. Thus, similarly with the operation at the time T10, the core C0 sets the unreached-thread count X1 at "3" (core number−1), and sets the flag register ZF at "1" ((c) and (d) of FIG. 7). Then, after executing the instruction code TEST&IDA, the core C1 causes the processing to jump to the single processing block SIB, increments the passing count m0, and stores the incremented passing count m0 into the main memory MM ((e) of FIG. 7).

Next, at a time T60, the core C3 completes execution of the parallel processing block PAB1, reaches the entrance of the single processing block SIB1 ((f) of FIG. 7), and operates similarly with the core C0 at the time T20. The core C3 sets the flag register SF at "1", changes the unreached-thread count X0 to "2", and resets the flag register ZF to "0" ((g), (h), and (i) of FIG. 7). Then, after executing the instruction code TEST&IDA, the core C3 causes the processing to jump to the exit of the single processing block SIB1, increments the passing count m3, and stores the incremented passing count m3 into the main memory MM ((j) of FIG. 7). Thereafter, at a time T70, the core C2 operates similarly with the time T30.

Next, at a time T80, before the processing of the core C1 reaches the entrance of the single processing block SIB1, the processing of the core C2 reaches the entrance of the single processing block SIB2 ((k) of FIG. 7). The core C2 operates similarly with the core C0 at the time T10 by using a storage area of an unreached-thread count X2 of the register REGi. Next, at a time T90, the processing of the core C0 reaches the entrance of the single processing block SIB2 ((l) of FIG. 7). The core C0 operates similarly as in the time T20 by using a storage area of the unreached-thread count X2 of the register REGi.

Figure 8:
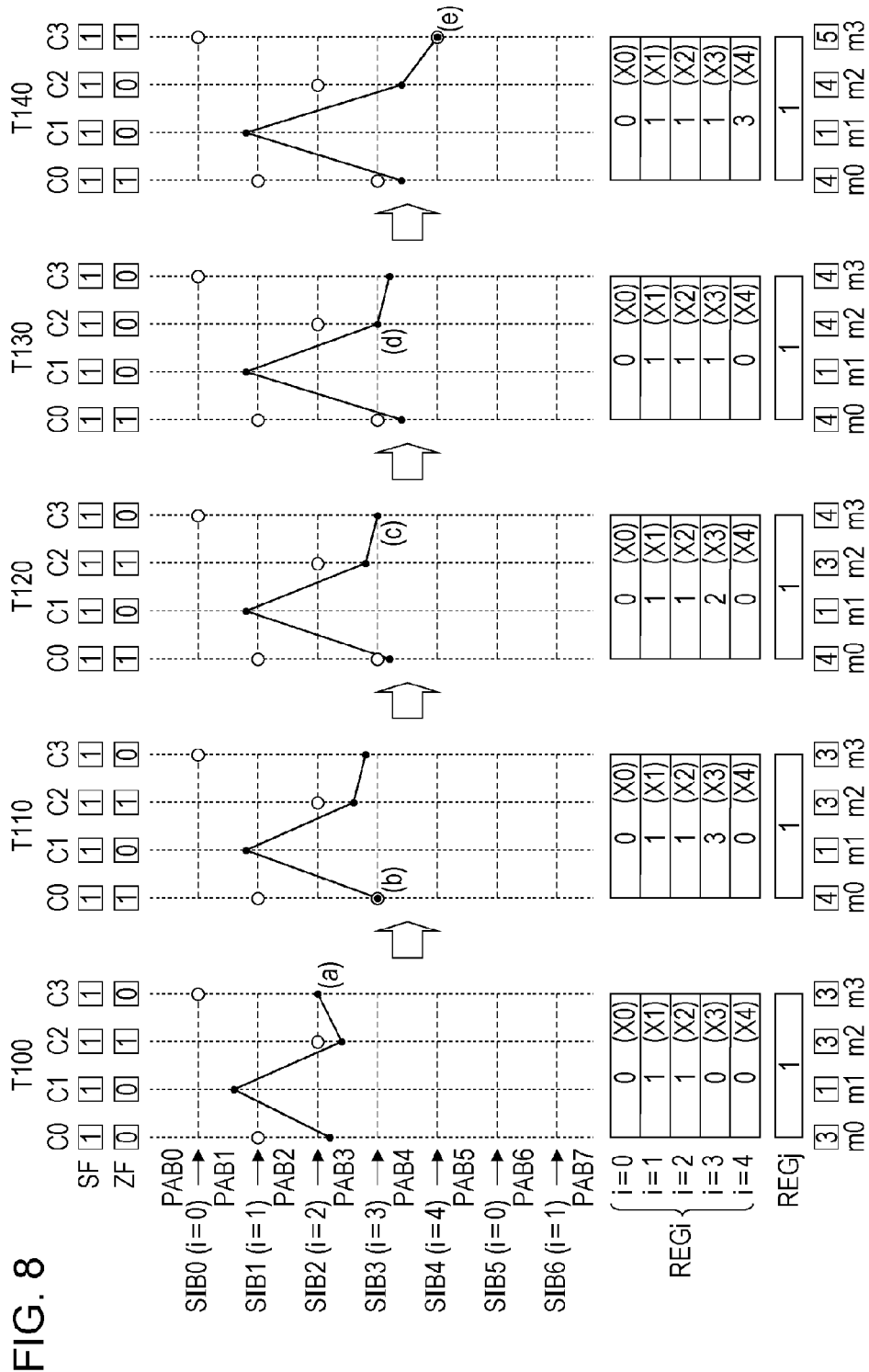

Next, at a time T100 of FIG. 8, the processing of the core C3 reaches the entrance of the single processing block SIB2 ((a) of FIG. 8). The core C3 operates similarly with the core C2 at the time T30 by using a storage area of the unreached-thread count X2 of the register REGi.

Next, at a time T110, before the processing of the core C1 reaches the entrance of the single processing block SIB1, the processing of the core C0 reaches the entrance of the single processing block SIB3 ((b) of FIG. 8). The core C0 operates similarly with the time T50 by using a storage area of an unreached-thread count X3 of the register REGi.

Next, at a time T120, the processing of the core C3 reaches the entrance of the single processing block SIB3 ((c) of FIG. 8). The core C3 operates similarly with the time T60 by using a storage area of the unreached-thread count X3 of the register REGi. Next, at a time T130, the processing of the core C2 reaches the entrance of the single processing block SIB3 ((d) of FIG. 8). The core C2 operates similarly with the time T70 by using a storage area of the unreached-thread count X3 of the register REGi.

Next, at a time T140, before the processing of the core C1 reaches the entrance of the single processing block SIB1, the processing of the core C3 reaches the entrance of the single processing block SIB4 ((e) of FIG. 8). The core C3 operates similarly with the time T10 by using a storage area of an unreached-thread count X4 of the register REGi.

Next, at a time T150 of FIG. 9, the processing of the core C2 reaches the entrance of the single processing block SIB4 ((a) of FIG. 9). The core C2 operates similarly with the core C0 at the time T20 by using a storage area of the unreached-thread count X4 of the register REGi.

Next, at a time T160, before the processing of the core C1 reaches the entrance of the single processing block SIB1, the processing of the core C2 reaches the entrance of the single processing block SIB5 ((b) of FIG. 9). Before the processing of the core C2 reaches the entrance of the single processing block SIB5, the passing count m2 is "5", the total passing count j is "1", and "m2−j (=4)" is smaller than the number I ("5") of the register REGi. Thus, in the step S102 illustrated in FIG. 5, the register REGi is determined to have a free space. In the step S106 illustrated in FIG. 5, the core C2 calculates a remainder (=0) by dividing the passing count m2 (=5) by the number I (=5) of the registers REGi, and determines to use a storage area of the unreached-thread count X0 of the register REGi ((c) of FIG. 9). Then, the core C2 operates similarly with the core C3 at the time T10 by using a storage area of the unreached-thread count X0.

Next, at a time T170, before the processing of the core C1 reaches the entrance of the single processing block SIB1, the processing of the core C2 reaches the entrance of the single processing block SIB6 ((d) of FIG. 9). Before the processing of the core C2 reaches the entrance of the single processing block SIB6, the passing count m2 is "6", the total passing count j is "1", and "m2−j (=5)" is same as the number I ("5") of the register REGi. Thus, in the step S102 illustrated in FIG. 5, the core C2 determines that there is no free space in the register REGi, sets the flag register SF at "0", and ends the instruction code TEST&IDA ((e) of FIG. 9).

In the step S204 of FIG. 4, the core C2 determines that the flag register SF is "0", and waits for a predetermined period of time in the step S206. That is, the core C2 waits without causing the processing to jump to the single processing block SIB6, and does not increment the passing count m2 as well.

Next, at a time T181, the core C1 completes execution of the parallel processing block PAB1, and reaches the entrance of the single processing block SIB1 ((f) of FIG. 9). Before the processing of the core C1 reaches the entrance of the single processing block SIB1, the passing count m1 is "1", the total passing count j is "1", and "m1−j (=0)" is smaller than the number I ("5") of the register REGi. Thus, in the step S104 of FIG. 5, the core C1 sets the flag register SF at "1" ((g) of FIG. 9).

Before the processing of the core C1 reaches the entrance of the single processing block SIB1, the unreached-thread count X1 is "1". Thus, in steps S116 and S118 of FIG. 5, the core C1 changes the unreached-thread count X1 to "0", and resets the flag register ZF to "0" ((h) and (i) of FIG. 9).

Further, since the unreached-thread count X1 becomes "0", the core C1 increments the total passing count j to "2" in the step S122 of FIG. 5 ((j) of FIG. 9).

After executing the instruction code TEST&IDA, the core C1 causes the processing, in the step S212 illustrated in FIG. 4, to jump to the exit of the single processing block SIB1, since the flag register SF is "1", and the flag register ZF is "0". In steps S214 and S216 illustrated in FIG. 4, the core C1 increments the passing count m1, and stores the incremented passing count m1 into the main memory MM ((k) of FIG. 9). When the core C2 executes the other arithmetic operation while waiting for a predetermined period of time, values of flag registers SF, ZF become indefinite ("0" or "1").

Thereafter, at a time T182, the core C2 waits for a predetermined period of time, and then executes the instruction code TEST&IDA. Although times T181 and T182 are provided separately for the purpose of illustration, operations indicated at times T181 and T182 are executed consecutively.

Before reaching the time T182, the passing count m2 is "6", the total passing count j is "2", and "m2−j (=4)" is smaller than the number I ("5") of the register REGi. Thus, the core C2 sets the flag register SF at "1" ((l) of FIG. 9). In the step S106 illustrated in FIG. 5, the core C2 calculates a remainder (=1) by dividing the passing count m2 (=6) by the number I (=5) of the registers REGi, and determines to use a storage area of the unreached-thread count X1 of the register REGi. Since the unreached-thread count X1 is "0" before reaching the time T182, the core C2 sets the unreached-thread count X1 at "3" (core number−1) in steps S110 and S112 illustrated in FIG. 5, and sets the flag register ZF at "1" ((m) and (n) of FIG. 9).

After executing the instruction code TEST&IDA, the core C2 causes the processing, in the step S210 illustrated in FIG. 4, to jump to the single processing block SIB6, since flag registers SF and ZF are "1" ((o) of FIG. 9). In steps S214 and S216 illustrated in FIG. 4, the core C2 increments the passing count m2, and stores the incremented passing count m2 into the main memory MM ((p) of FIG. 9).

Figure 10:
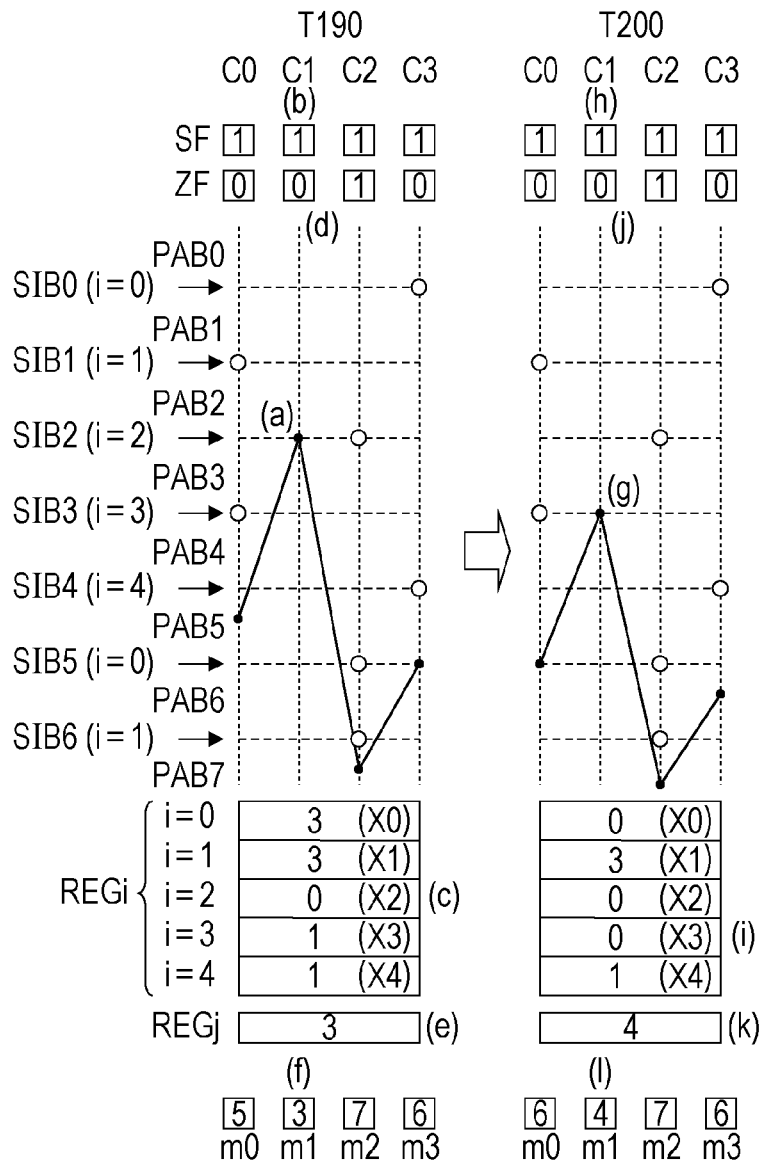

Next, at a time T190 of FIG. 10, the core C1 completes execution of the parallel processing block PAB2, and reaches the entrance of the single processing block SIB2 ((a) of FIG. 10). Similarly with the operation of the core C1 at the time T181 of FIG. 9, the core C1 sets the flag register SF at "1", decrements the unreached-thread count X2 to "0", and resets the flag register ZF to "0" ((b), (c), and (d) of FIG. 10). Thus, a storage area of the unreached-thread count X2 of the register REGi becomes available. Further, since the unreached-thread count X2 becomes "0", similarly with the time T181 of FIG. 9, the core C1 increments the total passing count j to "3"((e) of FIG. 10).

After executing the instruction code TEST&IDA, since the flag register SF is "1", and the flag register ZF is "0", the core C1 causes the processing to jump to the exit of the single processing block SIB2, increments the passing count m1, and stores the incremented passing count m1 into the main memory MM ((f) of FIG. 10).

Next, at a time T200, the core C1 completes execution of the parallel processing block PAB3, and reaches the entrance of the single processing block SIB3 ((g) of FIG. 10). Similarly with the operation of the core C1 at the time T190, the core C1 sets the flag register SF at "1", decrements the unreached-thread count X3 to "0", and resets the flag register ZF to "0" ((h), (i), and (j) of FIG. 10). Thus, a storage area of the unreached-thread count X3 of the register REGi becomes available. Further, similarly with the operation at the time T190, the core C1 increments the total passing count j to "4", causes the processing to the exit of the single processing block SIB3, and increments the passing count m1 ((k) and (l) of FIG. 10).

Figure 11:
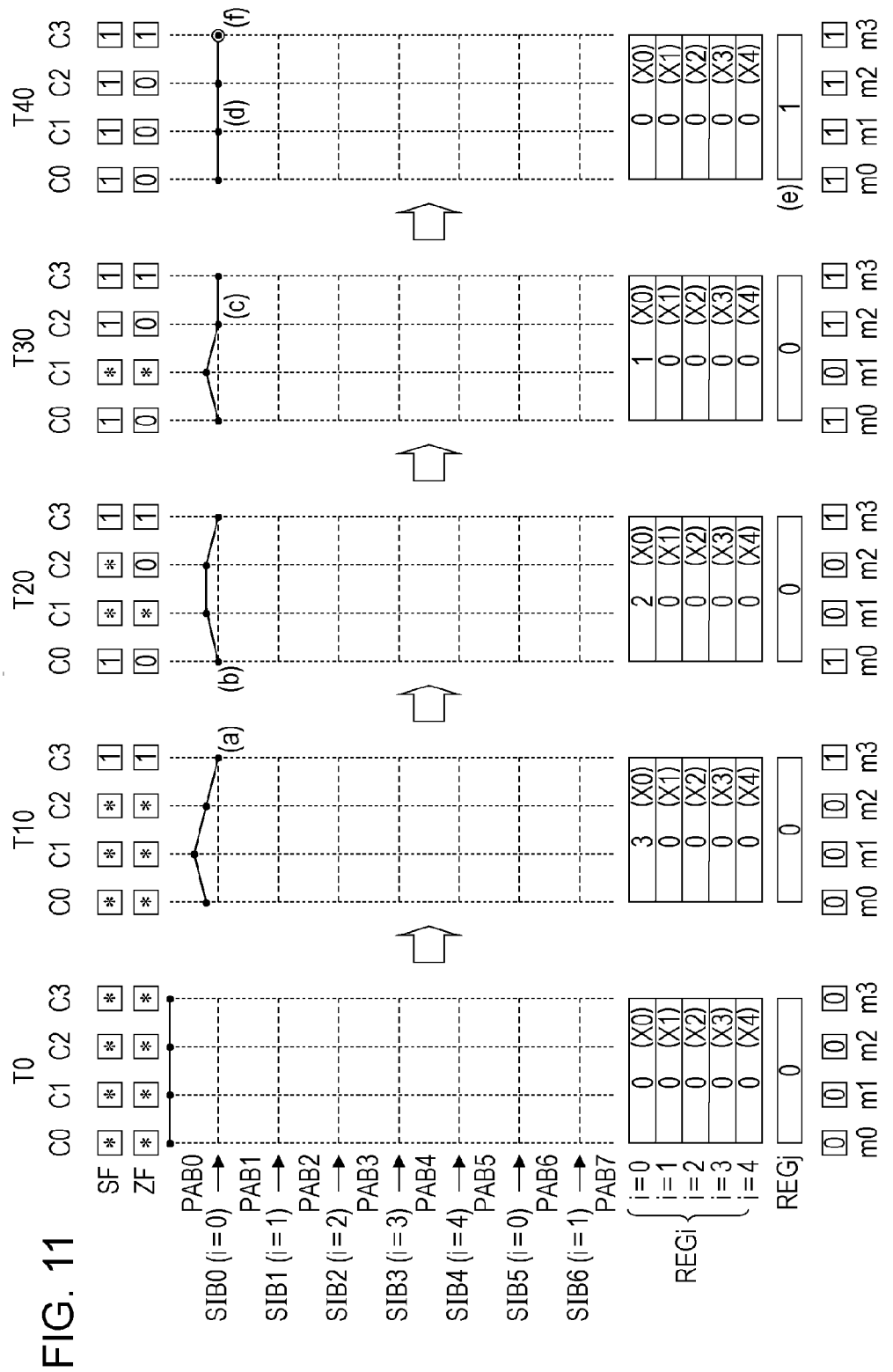
FIGS. 11 to 12 are diagrams illustrating an example of a sequence of operations performed by a plurality of processors, according to an embodiment.
Figure 12:
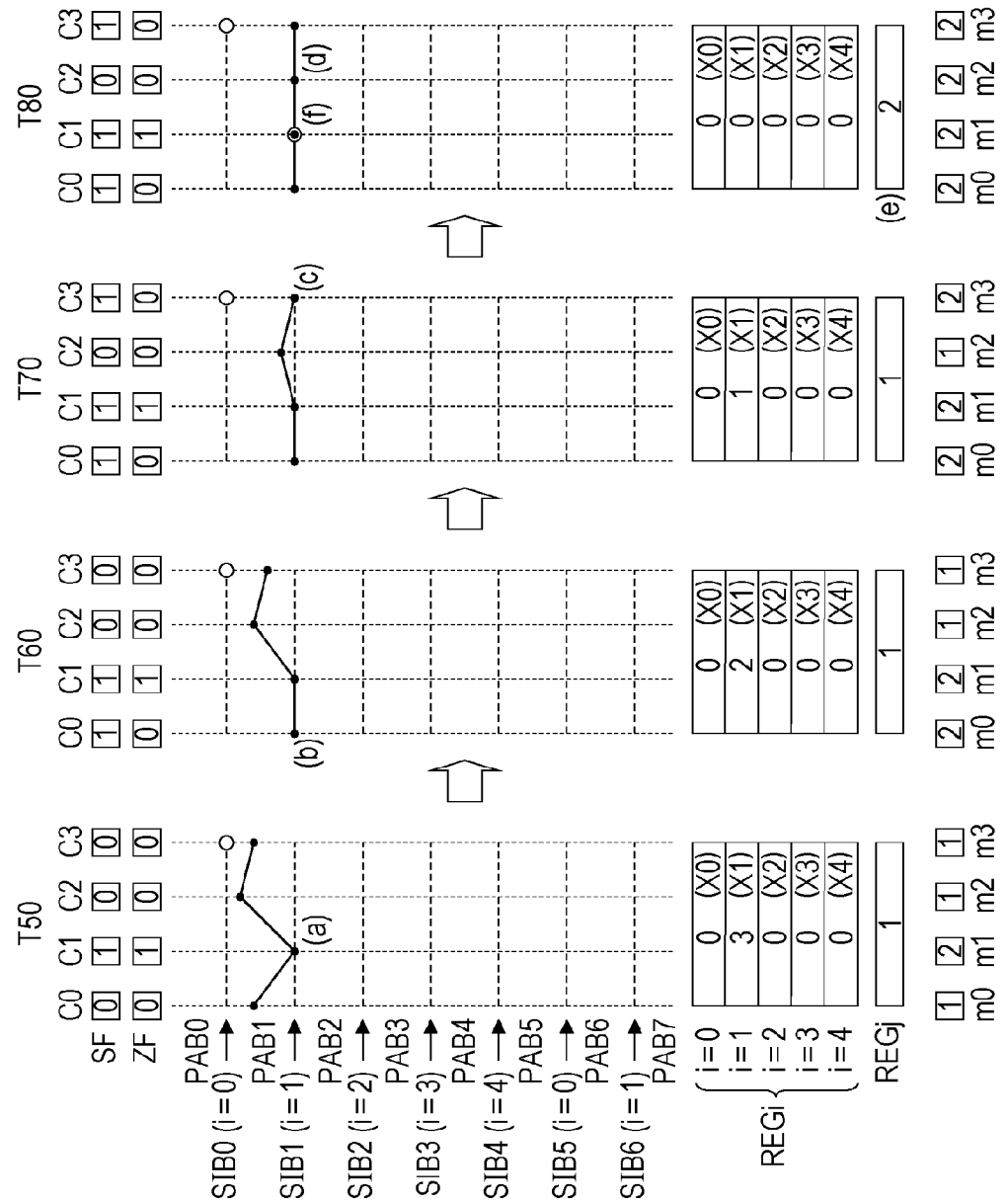

FIGS. 11 to 12 illustrate another example of the operation of the CPU illustrated in FIG. 2. Detailed description of the same or like operations as those operations illustrated in FIG. 6 to FIG. 10 is omitted. In FIG. 11 and FIG. 12, each of single processing block SIBs (SIB0 to SIB6) is executed after each of parallel processing block PABs (PAB0 to PAB6) has been executed by all cores C0 to C3. For example, FIG. 11 and FIG. 12 illustrate an example of operations executed in the parallel processing block PAB by cores C0 to C3 in parallel, and then in the single processing block SIB by any one of cores C0 to C3 by using operation results of the parallel processing block PAB.

Operations at times T0 and T10 are the same as operations at times T0 and T10 illustrated in FIG. 6. At the time T10, the core C3, which has completed processing in the parallel processing block PAB0 and whose processing has reached the entrance of the single processing block SIB0 in first place, causes the processing to jump to the single processing block SIB0 in the step S210 illustrated in FIG. 4. However, start of the single processing block SIB0 is suspended until other cores C0 to C2 complete processing of the parallel processing block PAB0 and reach the entrance of the single processing block SIB0 ((a) of FIG. 11).

Next, at a time T20, the processing of the core C0 reaches the entrance of the single processing block SIB, and at a time T30, the processing of the core C2 reaches the entrance of the single processing block SIB ((b) and (c) of FIG. 11). In the step S211 illustrated in FIG. 4, after causing the processing to jump to the exit of the single processing block SIB0, cores C0 and C1 suspend start of the parallel processing block PAB1 until execution of the single processing block SIB0 by the core C3 completes.

Next, at a time T40, the processing of the core C1 reaches the entrance of the single processing block SIB, and the total passing count j is set at "1" ((d) and (e) of FIG. 11). The core C3 executes the single processing block SIB0 after processing of all cores C0 to C3 reaches the entrance of the single processing block SIB0, and starts the parallel processing block PAB1 after completion of the single processing block SIB0 ((f) of FIG. 11). Cores C0 to C2 start processing of the parallel processing block PAB1. In the case, although passing counts m3, m0, and m2 are changed from "0" to "1" respectively at times T10 to T30, the passing counts m3, m0, and m2 may be changed after the core C3 executes the single processing block SIB0 at a time T40.

Next, at a time T50 of FIG. 12, the processing of the core C1 reaches the entrance of the single processing block SIB1 in first place, in the step S210 illustrated in FIG. 4, the core C1 causes the processing to jump to the single processing block SIB1. However, similarly with the operation at the time T10 illustrated in FIG. 11, start of the single processing block SIB1 is suspended until processing of other cores C0, C2, and C3 reaches the entrance of the single processing block SIB1 ((a) of FIG. 12).

Thereafter, at times T60, T70, and T80, processing of core C0, C3, and C2 reach the entrance of the single processing block SIB1 sequentially ((b), (c), and (d) of FIG. 12). The core C2, whose processing reaches the entrance of the single processing block SIB1 in last place sets the total passing count j at "2" ((e) of FIG. 12). Then, the core C1 executes the single processing block SIB1 after all other cores C0, C2, and C3 have reached the entrance of the single processing block SIB1 ((f) of FIG. 12).

FIG. 13 illustrates an example of a program executed by the CPU illustrated in FIG. 2. The program illustrated in FIG. 13 is a source program described based on the OpenMP (registered trademark) standard which is one of application programming interfaces (APIs) for multithread programming. The program illustrated in FIG. 13 is a source program generated by compiling a source program, described in the C-language and so on, with a compiler compatible with the OpenMP standard.

A statement "#pragma omp parallel" indicates that blocks enclosed in "{ }" are executed in parallel with each other. A statement "#pragma omp single" indicates that a block enclosed in "{ }" is executed by a single thread. A clause "(nowait)" indicates that a thread, which has completed a single processing block SIB directed by the statement "#pragma omp single", shifts to a next processing regardless of the status of other threads. Operations illustrated in FIG. 6 to FIG. 10 are implemented by a program illustrated in FIG. 13 including description of the statement "#pragma omp single (nowait)".

On the other hand, an exit of a statement "#pragma omp single" modified by excluding a clause "nowait" from a statement "#pragma omp single (nowait)" includes an implicit barrier for waiting for a next processing until completion of processing of all threads. Thus, when the statement "#pragma omp single (nowait)" illustrated in FIG. 13 is modified to the statement "#pragma omp single", the operation illustrated in FIG. 11 and FIG. 12 is implemented.

FIG. 14 illustrates another example of processing executed by the CPU illustrated in FIG. 2. A program illustrated in FIG. 14 is a source program described based on the OpenMP standard similarly with FIG. 13.

A statement "#pragma omp parallel for" indicates that "for sentence" in a next line is executed in parallel. In a program illustrated in FIG. 14, a parallel processing block PAB, a single processing block SIB, and a parallel block PAB are executed repeatedly by the number indicated by a variable COUNT. Similarly with the program illustrated in FIG. 13, the program illustrated in FIG. 14 implements the operation illustrated in FIG. 6 to FIG. 10.

FIG. 15 illustrates another example of processing executed by the CPU illustrated in FIG. 2. A program illustrated in FIG. 15 is a source program described based on the OpenMP standard similarly with FIG. 13. Two programs illustrated in FIG. 15 each execute the same processing.

A statement "#pragma omp sections" indicates that blocks enclosed in "{ }" are executed in parallel by allocating a thread for each statement "#pragma omp sections". An exit of a block specified by the statement "#pragma omp sections" includes an implicit barrier for waiting for a next processing until completion of processing of all the threads. Thus, when re-writing the statement "#pragma omp sections" to the statement "#pragma omp single (nowait)", a statement "#pragma omp barrier" is added to the end of the block "for sentence". The statement "#pragma omp barrier" is used for synchronization.

As described above, even in this embodiment, the CPU includes a register REGU which holds reaching-state information including the unreached-thread count Xi, and the total passing count j, similarly with the embodiment illustrated in FIG. 1. Thus, time for access to the reaching-state information may be reduced compared with the reaching-state information stored in the main memory MM. As a result, a processing efficiency of the thread executed by multiple cores C0 to C3 may be enhanced.

Further, a core C, whose processing has reached the entrance of the single processing block SIB in the last place, initializes areas corresponding to a register REGi to a state ready for holding a new unreached-thread count Xi. This enables execution of a single processing block SIB whose execution has been suspended, and also enables control of the propriety of executing a new single processing block SIB by using the initialized area. That is, the propriety of executing the single processing block SIB may be controlled by cyclically using multiple areas for storing the unreached-thread count Xi in the register REGi.

The passing count m managed for each of cores C0 to C3 is incremented for every passing of the single processing block SIB, and the total passing count j of cores C0 to C3 is incremented every time any processing of cores C0 to C3 reaches the entrance of each of single processing blocks SIB in the last place. Thus, execution or suspension of a single processing block SIB corresponding to the passing count m may be determined by comparing a difference between the passing count m and the total passing count j, and the number I indicating the number of areas for storing the unreached-thread count Xi in the register REGi, with each other.

A core C, whose processing has reached the entrance of the single processing block SIB in the second place or later, determines not to execute the single processing block SIB, and causes the processing to jump to the exit of the single processing block SIB to suppress execution of the single processing block SIB by multiple cores C.

Each of cores C, whose processing has reached the entrance of the single processing block SIB, fetches an instruction code TEST&IDA. The instruction code TEST&IDA is executed by a microprogram. Thus, a hardware function (architecture of instruction set) may be easily altered.

Figure 16:
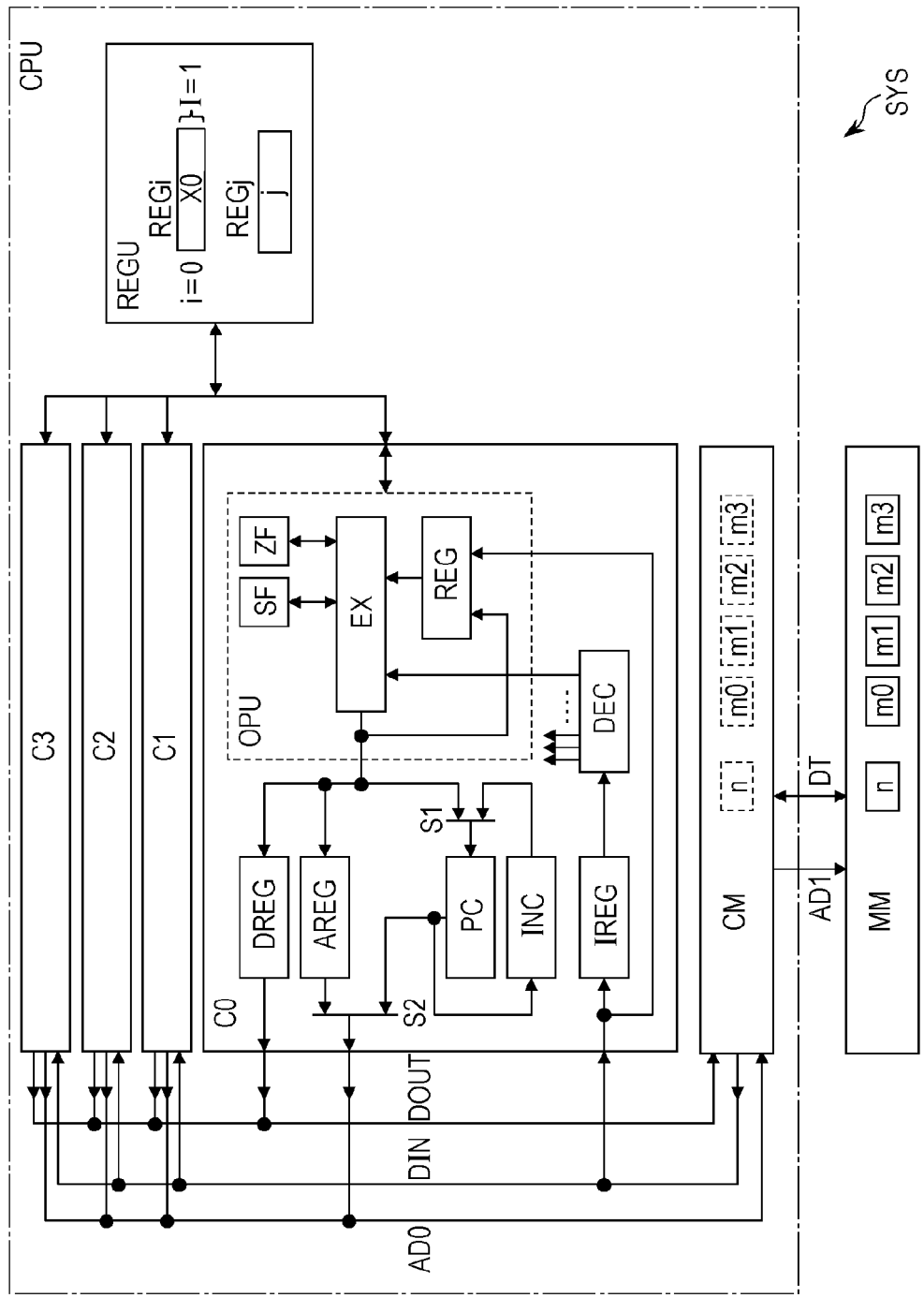
FIG. 16 is a diagram illustrating an example of a configuration of a plurality of processors, according to an embodiment.

FIG. 16 is a diagram illustrating another embodiment of a processor device and method of controlling the processor device. Elements that are the same as or similar to those illustrated in FIG. 1 to FIG. 15 are denoted with same reference numerals, and detailed description thereof is omitted.

The CPU illustrated in FIG. 16 includes a register unit REGU different from the register illustrated in FIG. 2. The register unit REGU includes one storage area (i=0) for storing the unreached-thread count X0. The other configuration of the CPU is the same as the CPU illustrated in FIG. 2. That is, the CPU illustrated in FIG. 16 includes multiple cores C (C0, C1, C2, and C3), a cash memory CM, and a register unit REGU. In a manner similar to the CPU in FIG. 2, each of cores C includes an operation unit OPU, a data register unit DREG, an address register unit AREG, a program counter PC, an incrementer INC, an instruction register unit IREG, a decoder unit DEC, and selectors S1, S2.

Processing executed by the CPU illustrated in FIG. 16 is the same as the processing illustrated in FIG. 3. Processing executed by each of cores C0 to C3 at the entrance of the single processing block SIB is the same as or similar to the processing illustrated in FIG. 4, and the operation of the instruction code TEST&IDA executed by each of cores C0 to C3 is the same as or similar to the operation illustrated in FIG. 5.

Figure 17:
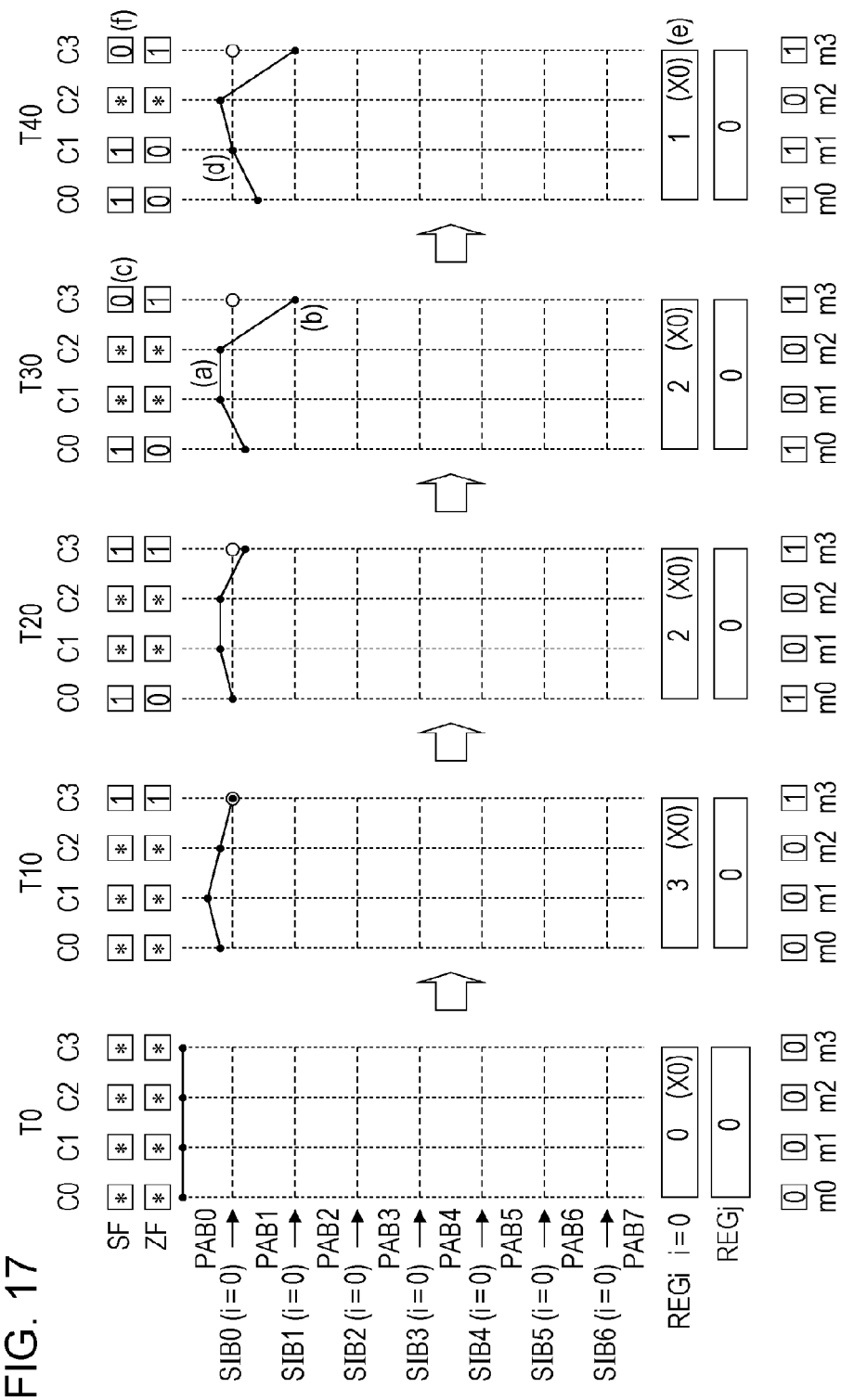
FIGS. 17 to 19 are diagrams illustrating an example of a sequence of operations performed by a plurality of processors, according to an embodiment.
Figure 18:
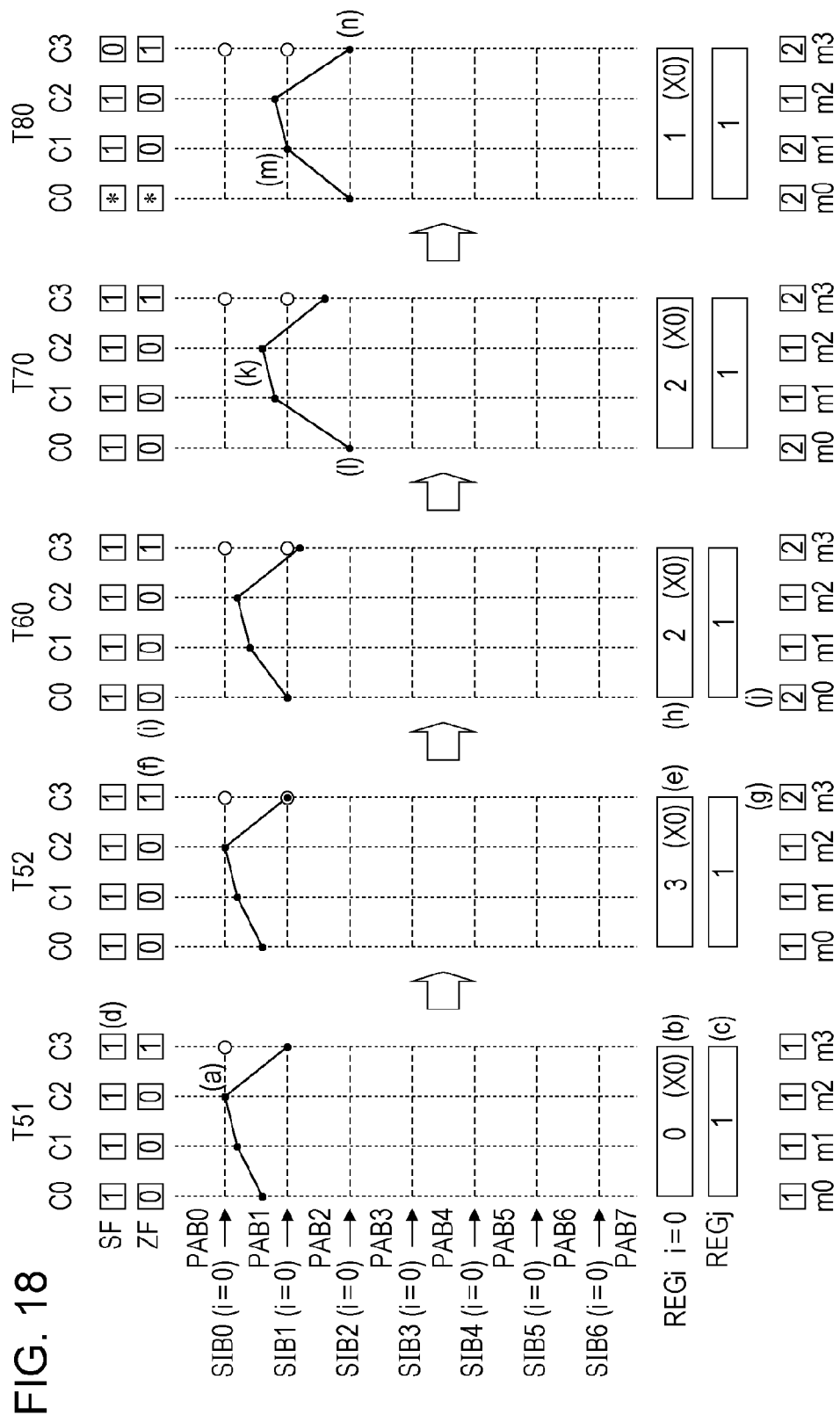
Figure 19:
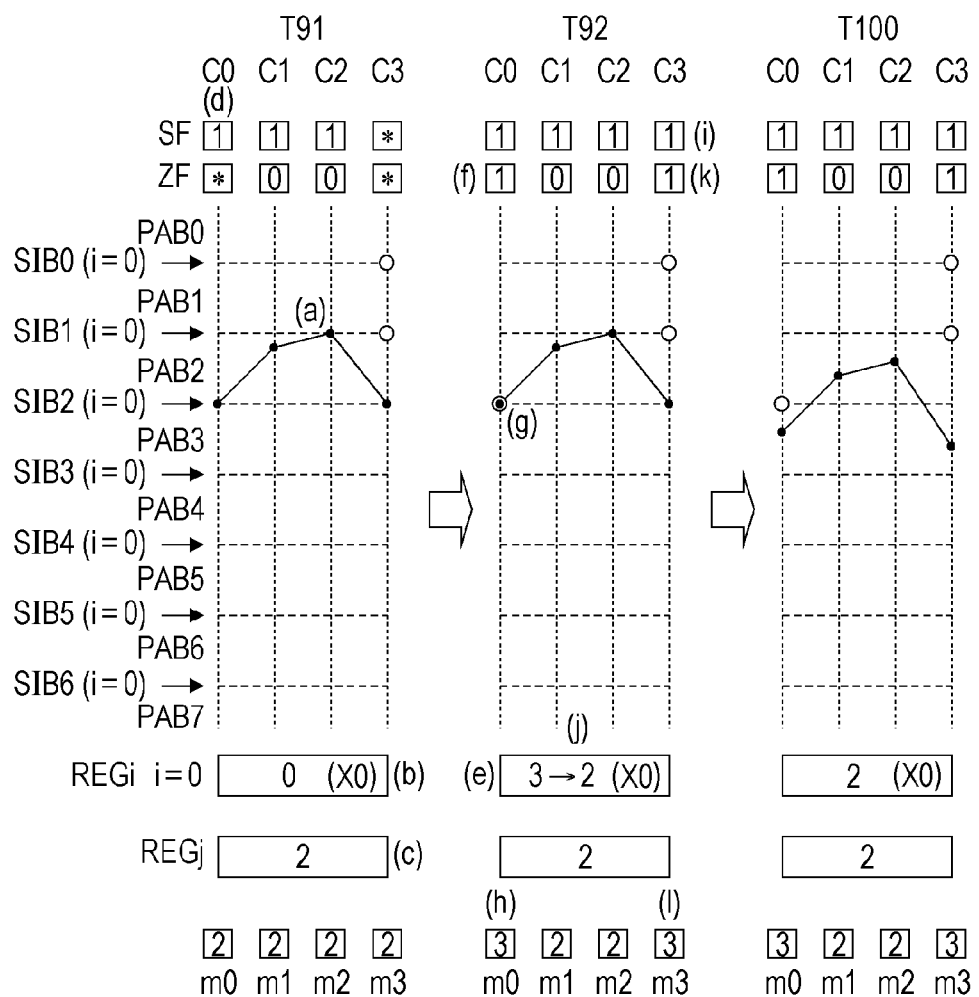

FIGS. 17 to 19 illustrate examples of the operation of the CPU illustrated in FIG. 16. Detailed description of operations that are the same as or similar to the operations of FIG. 6 to FIG. 10 is omitted. Operations at times T0, T10, and T20 are the same as the operations at times T0, T10, and T20 of FIG. 6.

At a time T30, before the processing of cores C1 and C2 reaches the entrance of the single processing block SIB0, the core C3 completes the parallel processing block PAB1, and the processing thereof reaches the entrance of the single processing block SIB1 ((a) and (b) of FIG. 17). Before the processing of the core C3 reaches the entrance of the single processing block SIB1, the passing count m3 is "1", the total passing count j is "0", and "m3−j (=1)" is the same as the number I ("1") indicating the number of the registers REGi. Thus, in the step S102 illustrated in FIG. 5, the core C3 determines that there is no free space in the register REGi, resets the flag register SF to "0", and ends the instruction code TEST&IDA ((c) of FIG. 17).

In the step S204 of FIG. 4, the core C3 determines that the flag register SF is "0", and waits for a predetermined period of time in the step S206. That is, the core C3 waits without causing the processing to jump to the single processing block SIB1, and does not increment the passing count m3 as well.

Next, at a time T40, the core C1 completes execution of the parallel processing block PAB0, the processing thereof reaches the entrance of the single processing block SIB0, and the unreached-thread count X0 of the register REGi is changed to "1" ((d) and (e) of FIG. 17). However, since "m3−j (=1) is the same as the number I ("1") indicating the number of the registers REGi in a manner similar to the time T30, the core C3 resets the flag register SF to "0" again, and waits for a predetermined period of time ((f) of FIG. 17).

Next, at a time T51 of FIG. 18, the core C2 completes execution of the parallel processing block PAB0, the processing thereof reaches the entrance of the single processing block SIB0, and the unreached-thread count X0 of the register REGi is changed to "0"((a) and (b) of FIG. 18). Since the unreached-thread count X0 becomes "0", the core C2 sets the total passing count j at "1" ((c) of FIG. 18).

The core C3, which has waited for the predetermined period of time in the step S206 illustrated in FIG. 4, executes the instruction code TEST&IDA (FIG. 5). Since the passing count m3 is "1", and "m3−j (=0)" is smaller than the number I ("1") indicating the number of the registers REGi, the core C3 sets the flag register SF at "1" ((d) of FIG. 18). The core C3 calculates a remainder i (=0) by dividing the passing count m3 (=1) by the number I (=1) indicating the number of the registers REGi, and determines to use a storage area of the unreached-thread count X0 of the register REGi.

Thereafter, at a time T52, since the unreached-thread count X0 is "0", the core C3 determines that the storage area of the unreached-thread count X0 is empty, sets "3" at the unreached-thread count X0, and sets the flag register ZF at "1" ((e) and (f) of FIG. 18). After executing the instruction code TEST&IDA, since flag registers SF, ZF are "1", the core C3 causes the processing to jump to the single processing block SIB1, increments the passing count m3, and stores the incremented passing count m3 into the main memory MM ((g) of FIG. 18). Although times T51 and T52 are provided separately for purpose of illustration, operations indicated at times T51 and T52 are executed consecutively.

Next, at a time T60, processing of the core C0 reaches the entrance of the single processing block SIB1, the unreached-thread count X0 is changed to "2", and the flag register ZF is reset to "0" ((h) and (i) of FIG. 18). After executing the instruction code TEST&IDA, since the flag register SF is "1", and the flag register ZF is "0", the core C0 causes the processing to jump to the exit of the single processing block SIB1, increments the passing count m0, and stores the incremented passing count m0 into the main memory MM ((j) of FIG. 18).

Next, at a time T70, before processing of cores C1 and C2 reaches the entrance of the single processing block SIB1, the core C0 completes the parallel processing block PAB2, and processing thereof reaches the entrance of the single processing block SIB2 ((k) and (l) of FIG. 18). The core C0 waits until the storage area of the unreached-thread count X0 becomes empty, in a manner similar to the core C3 at the time T30 of FIG. 17.

Next, at a time T80, processing of the core C1 reaches the entrance of the single processing block SIB1, and processing of the core C3 reaches the entrance of the single processing block SIB2 ((m) and (n) of FIG. 18). The core C3 waits until the storage area of the unreached-thread count X0 becomes empty, in a manner similar to the time T30 of FIG. 17. When the core C0 executes the other arithmetic operation while waiting for a predetermined period of time, values of flag registers SF, ZF become indefinite ("0" or "1").

Next, at a time T91 of FIG. 19, the processing of the core C2 reaches the entrance of the single processing block SIB1 ((a) of FIG. 19). The core C2 changes the unreached-thread count X0 to "0", and sets the total passing count j at "2" ((b) and (c) of FIG. 19). The core C0, which has executed the instruction code TEST&IDA for a predetermined period of time, sets the flag register SF at "1" since "m0−j (=0)" is smaller than the number I ("1") of the register REGi ((d) of FIG. 19).

Next, at a time T92, the core C0 calculates a remainder i (=0) by dividing the passing count m0 (=2) by the number I (=1) indicating the number of the registers REGi, and determines to use a storage area of the unreached-thread count X0. Then, the core C0 sets "3" to the unreached-thread count X0, and sets the flag register ZF at "1" ((e) and (f) of FIG. 19). After executing the instruction code TEST&IDA, since flag registers SF, ZF are "1", the core C0 causes the processing to jump to the single processing block SIB1, increments the passing count m0, and stores the incremented passing count m0 into the main memory MM ((g) and (h) of FIG. 19).

Thereafter, the core C3, which has executed the instruction code TEST&IDA when the passing count m3 is "2", sets the flag register SF at "1" since "m3−j (=0)" is smaller than the number I ("1") indicating the number of the registers REGi ((i) of FIG. 19). The core C3 changes the unreached-thread count X0 to "2", and resets the flag register ZF to "0" ((j) and (k) of FIG. 19). Although times T91 and T92 are provided separately for the purpose of illustration, operations indicated at times T91 and T92 are executed consecutively.

After executing the instruction code TEST&IDA, since the flag register SF is "1", and the flag register ZF is "0", the core C3 causes the processing to jump to the exit of the single processing block SIB1, increments the passing count m0, and stores the incremented passing count m0 into the main memory MM ((l) of FIG. 19). When the core C3 whose processing has reached the entrance of the single processing block SIB2, executes the instruction code TEST&IDA prior to the core C0, processing of the core C3 jumps to the single processing block SIB1, and processing of the core C0 jumps to the exit of the single processing block SIB1. That is, the core C3 executes the operation of the core C0 illustrated at times T91, T92, and the core C0 executes the operation of the core C3 illustrated at times T91, T92.

Then, at a time T100, cores C0, C3 execute the parallel processing block PAB3, and cores C1, C2 execute the parallel processing block PAB2.

In the embodiment illustrated in FIG. 17 to FIG. 19, since the CPU includes the register unit REGU for holding reaching-state information, time for access to the reaching-state information may be reduced compared with a case where the reaching-state information is stored in the main memory MM. As a result, a processing efficiency of the thread executed by multiple cores C0 to C3 may be enhanced.

The embodiments illustrated in FIG. 2 to FIG. 19 may be implemented by multiple CPUs respectively including multiple cores C. For example, when one CPU includes cores C0 and C1, and the other CPU includes cores C2 and C3, each CPU operates as illustrated in FIG. 4 to FIG. 12 and FIG. 17 to FIG. 20.

Each of cores C may execute multiple threads in parallel. In this case, when the core C0 illustrated in FIG. 2 executes two threads in parallel, and the core C1 illustrated in FIG. 2 executes two threads, the operation illustrated in FIG. 6 to FIG. 10 is implemented by replacing processing of cores C2 and C3 with processing of cores C0 and C1, respectively. Similarly, parallel execution of multiple threads by each of cores C illustrated in FIG. 17 to FIG. 19 is implemented by replacing processing of cores C2 and C3 with processing of cores C0 and C1, respectively.

Characteristics and advantages of the embodiments shall be apparent from the above detailed description. This intends that the appended claims cover the characteristics and advantages of the above embodiments within a scope not deviating from the spirit and the right thereof. Any modifications and variations may be readily conceivable to those of ordinary skill in the art. Therefore, it is not intended to limit the scope of embodiments having inventiveness to the foregoing, and appropriate modifications and equivalents included in the scope disclosed in the embodiments may be covered.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
a plurality of processors configured to execute a task by dividing the task into multiple threads including a single thread and a parallel thread, the single thread being a thread to be executed by only one of the plurality of processors whose respective processing has reached the thread, the parallel thread being a thread to be executed in parallel with another parallel thread by the plurality of processors; and
registers configured to hold information to be shared by the plurality of processors, wherein
each of the plurality of processors is configured:
to execute one of the multiple threads at a time;

to cause the registers to hold reaching-state information indicating an extent to which the multiple threads executed by the plurality of processors have reached the single thread; and to determine whether to execute the single thread, based on the reaching-state information held in the registers and whether there is available area in the registers to store new reaching-state information to indicate execution of the single thread.

2. The apparatus of claim 1, wherein
the multiple threads includes multiple single threads to be sequentially executed, the multiple single threads including a first single thread, and a second single thread to be executed after the first single thread; and when a first processor of the plurality of processors detects that processing executed by the first processor reaches the second single thread before processing executed by one of the plurality of processors other than the first processor reaches the first single thread, with there being no available area in the registers for holding new reaching-state information to indicate execution of the second single thread, the first processor determines to suspend execution of the second single thread.

3. The apparatus of claim 1, wherein
the multiple threads includes multiple single threads to be sequentially executed;

the registers include reached-processor count areas each holding, as reaching-state information for the multiple single threads, a reached-processor count in association with each of the multiple single threads, the reached-processor count indicating a number of the plurality of processors whose respective processing has reached the each single thread; and a first processor of the plurality of processors, whose processing has lastly reached the each single thread, initializes the reached-processor count area associated with the each single thread to thereby provide an available area in the registers so as to enable the reached-processor count area to hold new reaching-state information to indicate execution for the each single thread.

4. The apparatus of claim 3, wherein
the registers include a total passing count area configured to hold, as the reaching-state information for the multiple single threads, a total passing count indicating a number of single threads that have been passed through by processing of all the plurality of processors; and when a difference between the total passing count and a passing count of a second processor of the plurality of processors is equal to or greater than a number of the reached-processor count areas, the second processor suspends execution of a first single thread associated with the second processor, the passing count indicating a number of single threads that have been passed through by processing of each of the plurality of processors.

5. The apparatus of claim 4, wherein
a third processor of the plurality of processors that has lastly reached a single thread among the plurality of processors increments the total passing count.

6. The apparatus of claim 1, wherein
a first processor of the plurality of processors that has determined not to execute the single thread causes processing thereof to jump to an exit of the single thread.

7. The apparatus of claim 1, wherein
each of the plurality of processors is configured to decode an instruction code included in a program, and operate based on the decoded instruction code, and operation of the each processor is performed based on a first instruction code included in the program executed by the each processor, the first instruction code being fetched when processing of the each processor reaches the single thread.

8. A method of controlling an apparatus including a plurality of processors and registers, the registers being configured to hold information shared by the plurality of processors, the plurality of processors being configured to execute a task by dividing the task into multiple threads including a single thread and a parallel thread, the single thread being a thread to be executed by only one of the plurality of processors whose respective processing has reached the thread, the parallel thread being a thread to be executed in parallel with another parallel thread by the plurality of processors, the method comprising:

executing, by each of the plurality of processors, one of the multiple threads at a time;

causing, by the each processor, the registers to hold reaching-state information indicating an extent to which the multiple threads executed by the plurality of processors have reached the single thread; and determining, by the each processor, whether to execute the single thread, based on the reaching-state information held in the registers and whether there is available area in the registers to store new reaching-state information to indicate execution of the single thread.

* * * * *